United States Patent
Bai et al.

(10) Patent No.: US 11,150,225 B2
(45) Date of Patent: Oct. 19, 2021

(54) FILTERS FOR LIQUID FLOW BASED DEVICES AND SYSTEMS

(71) Applicant: Agilent Technologies, Inc., Santa Clara, CA (US)

(72) Inventors: Qing Bai, Sunnyvale, CA (US); Ares Geovanos, San Francisco, CA (US); Hongfeng Yin, Cupertino, CA (US); Thor Miller Wilbanks, Berkeley, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 520 days.

(21) Appl. No.: 15/851,965

(22) Filed: Dec. 22, 2017

(65) Prior Publication Data
US 2019/0195841 A1 Jun. 27, 2019

(51) Int. Cl.
| | |
|---|---|
| *G01N 30/60* | (2006.01) |
| *B01D 15/22* | (2006.01) |
| *B01D 29/56* | (2006.01) |
| *B01D 29/01* | (2006.01) |
| *G01N 30/02* | (2006.01) |

(52) U.S. Cl.
CPC .......... *G01N 30/603* (2013.01); *B01D 15/22* (2013.01); *B01D 29/01* (2013.01); *B01D 29/56* (2013.01); *G01N 2030/027* (2013.01)

(58) Field of Classification Search
CPC ...... B01D 15/10; B01D 15/12; B01D 15/125; B01D 15/14; B01D 15/22; B01D 29/01; B01D 29/012; B01D 29/03; B01D 29/05; B01D 29/50; B01D 29/56; B01D 29/58; G01N 30/60; G01N 30/6004; G01N 30/6017; G01N 30/603
See application file for complete search history.

(56) References Cited

U.S. PATENT DOCUMENTS

| | | | | |
|---|---|---|---|---|
| 3,812,972 | A * | 5/1974 | Rosenblum | .......... B01D 25/001 210/489 |
| 4,721,567 | A * | 1/1988 | Uram | ..................... B01D 29/03 210/489 |
| 2005/0211616 | A1 | 9/2005 | DiLeo et al. | |
| 2005/0263452 | A1 | 12/2005 | Jacobson | |
| 2011/0100901 | A1 | 5/2011 | Maso | |

(Continued)

OTHER PUBLICATIONS

International Search Report and Written Opinion issued in counterpart PCT Application No. PCT/US2018/056892 dated Jun. 4, 2019.

(Continued)

*Primary Examiner* — David C Mellon
(74) *Attorney, Agent, or Firm* — Mannava & Kang, P.C.

(57) ABSTRACT

A filter includes an inlet side, an outlet side, and a body. The body includes a first substrate that includes an array of inlet holes passing through the first substrate, and a second substrate that includes an array of outlet holes passing through the second substrate. The body further includes an intermediate region that includes a plurality of channels extending along a plane that is transverse or at an angle to a main axis of the filter. Each channel communicates directly or indirectly with at least one of the inlet holes and at least one of the outlet holes. The filter provides a plurality of fluid flow paths through the body from the inlet side to the outlet side.

18 Claims, 17 Drawing Sheets

(56) References Cited

U.S. PATENT DOCUMENTS

| | | |
|---|---|---|
| 2013/0001145 A1 | 1/2013 | Yin et al. |
| 2014/0223873 A1 | 8/2014 | Warkiani et al. |
| 2014/0305228 A1 | 10/2014 | Witt et al. |
| 2016/0067634 A1 | 3/2016 | Richardson |
| 2016/0084806 A1 | 3/2016 | Yin et al. |

OTHER PUBLICATIONS

Extended European Search Report issued in European Patent Application No. 18890369.4 dated Aug. 30, 2021, (8 pages).

* cited by examiner

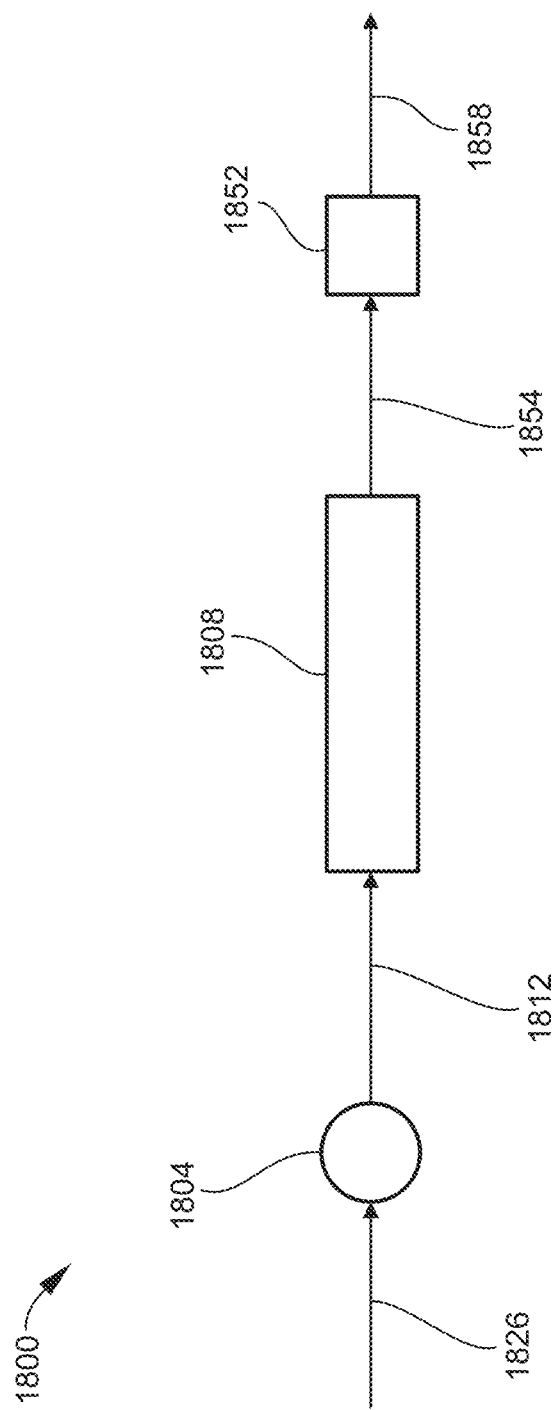

FILTERS FOR LIQUID FLOW BASED DEVICES AND SYSTEMS

TECHNICAL FIELD

The present invention relates generally to filters utilized in liquid flow-based devices and systems, for example as particulate filters in flow paths of devices and systems or as frits in liquid chromatography (LC) columns.

BACKGROUND

Porous filters are utilized in various devices and systems involving the flow of liquid. Typically, a porous filter is a planar structure such as a disk or plate. Such a filter generally has two opposing planar sides, and multiple pores extending through the thickness of the filter to provide multiple flow paths from one side to the other side. The filter may be positioned in a liquid flow path (e.g., the lumen of a liquid conduit) so as to span the cross-sectional flow area of the flow path. As liquid flows through the pores of the filter, particles carried in the liquid that are smaller than the size (cross-sectional dimension) of the pores are able to pass through the filter, while particles greater than the pore size are prevented from passing through the filter.

Porous filters are utilized, for example, in liquid chromatography (LC) systems. In an LC system, a mobile phase consisting of one or more solvents is driven under a high system pressure through a sample separation unit, which often is provided in the form of a chromatography column (or cartridge). In high-performance LC (HPLC) systems and ultra high-performance LC (UHPLC) systems, the system pressure may be as high as, for example, 1500 bar or greater. The LC column contains a stationary phase, which in LC is typically provided in the form of a packed bed of particles. Porous filters are utilized in LC columns to retain and stabilize the packed bed of particles. Specifically, one filter is positioned near the inlet end (head) of the column, the other filter is positioned near the outlet end of the column, and the particles are packed between the two filters. The pore size of the filters is smaller than the size of the particles. Consequently, the filters prevent the particles from escaping the column, either through the outlet end as the mobile phase and sample are driven through the column or through the inlet end in the event of back flow. When utilized in an LC column, porous filters are typically referred to as frits.

In certain applications, such as LC applications, the ideal characteristics of such filters or frits include tight distribution of desired pore size, high pore density, low back pressure drop, high operation pressure, and small delay volume. Moreover, there are increasing demands for high efficiency frits and filters with very small pore sizes (e.g., below 2 micrometers (µm)) in UHPLC applications. The most commonly utilized approach to creating mechanically strong filters/frits of small pore sizes is to sinter powders or fibers in metals, polymers, and other materials. However, as the result of such fabrication process, neither the pore size nor the liquid flow path is well controlled. It is not uncommon to see particles much larger than the specified pore size passing through sintered filters/frits. In addition, as the pore size decreases, it becomes more difficult to make filters/frits reliably and maintain their pressure drop in a practical range.

FIG. 1A is a scanning electron microscope (SEM) image of a top view of a region of a sintered stainless steel (SS) frit with the specification of 0.3 µm porous grade. FIG. 1B is an SEM image of a cross-sectional view of a region of the sintered SS frit shown in FIG. 1A. FIG. 2 is a plot of the transmission (filtration) characteristics of a sintered SS frit such as shown in FIGS. 1A and 1B, specifically the fraction of particles blocked (%) as a function of particle size (µm). FIG. 2 indicates that 2 µm or larger particles can pass through the sintered SS frit easily. FIG. 3 is an SEM image of particles collected downstream from an LC column utilizing such sintered SS frits. FIG. 3 is evidence that a significant amount of 1.8 µm particles passed through the sintered SS frit at the outlet end of the column during operation.

One solution for packing sub-2 µm particles in an LC column using a 0.3 µm-grade sintered SS frit is to preload the frit with some larger secondary particles, such as particles with a mean diameter of 3.5 µm in size and then pack the column with smaller particles. FIG. 4 is an SEM image of a region of such a frit. Although this frit can be used to stabilize the column bed, it has several disadvantages, including high surface area of both the mechanical frit and the secondary particles, high back pressure, and potential band broadening in the detected chromatographic peaks caused by uneven flow through the frit.

In view of the foregoing, an ongoing need exists for improved filters for liquid flow-based devices and systems, including filters utilized as frits to retain particulate material.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a filter includes: an inlet side; an outlet side; and a body having a thickness along a main axis between the inlet side and the outlet side, and a planar area in a transverse plane orthogonal to the main axis, the body comprising: a first substrate comprising a first outside surface at the inlet side, a first inside surface, and an array of inlet holes passing through the first substrate from the first outside surface to the first inside surface; a second substrate comprising a second outside surface at the outlet side, a second inside surface facing the first inside surface, and an array of outlet holes passing through the second substrate from the second inside surface to the second outside surface, wherein the outlet holes are not in direct fluid communication with the inlet holes; and a channel region comprising a plurality of channels extending at an angle to the main axis, each channel communicating with at least one of the inlet holes and at least one of the outlet holes, wherein: the filter comprises a plurality of fluid flow paths through the body from the inlet side to the outlet side; each flow path runs from at least one of the inlet holes to at least one of the channels, and from the at least one channel to at least one of the outlet holes; and each flow path comprises a first turn between the at least one inlet hole and the at least one channel, and a second turn between the at least one channel and the at least one outlet hole.

According to another embodiment, the first substrate is a first outer substrate, the second substrate is a second outer substrate, the channel region is a first channel region, and the channels of the first channel region are first channels; the filter further comprises an inner substrate between the first outer substrate and the second outer substrate, the inner substrate comprising an array of inner holes passing through the inner substrate, wherein a first group of the inner holes are in direct fluid communication with corresponding inlet holes, and a second group of inner holes are in direct fluid communication with corresponding outlet holes; the filter further comprises a second channel region comprising a plurality of second channels extending at an angle to the main axis; each first channel communicates with at least one of the inlet holes and at least one of the second group of inner holes; and each second channel communicates with at least one of the first group of inner holes and at least one of the outlet holes.

According to another embodiment, the first substrate is a first outer substrate, the second substrate is a second outer substrate, the channel region is a first channel region, and the channels of the first channel region are first channels; the filter further comprises an inner substrate between the first outer substrate and the second outer substrate, the inner substrate comprising an array of inner holes passing through the inner substrate; the filter further comprises a second channel region comprising a plurality of second channels extending at an angle to the main axis; each first channel communicates with at least one of the inlet holes and at least one of the inner holes; each second channel communicates with at least one of the inner holes and at least one of the outlet holes; wherein the inner holes are in direct communication with neither the inlet holes nor the outlet holes; and the first channels have a first critical dimension, and the second channels have a second critical dimension less than the first critical dimension.

According to another embodiment, the first substrate is a first outer substrate, the second substrate is a second outer substrate, the channel region is a first channel region, and the channels of the first channel region are first channels; the filter further comprises a first inner substrate and a second inner substrate stacked between the first outer substrate and the second outer substrate, the first inner substrate comprising an array of first inner holes passing through the first inner substrate, and the second inner substrate comprising an array of second inner holes passing through the second inner substrate, wherein: the array of first inner holes comprise a first group of first inner holes and a second group of first inner holes; the array of second inner holes comprise a first group of second inner holes and a second group of second inner holes; the first group of the first inner holes are in direct fluid communication with corresponding inlet holes, and the second group of the first inner holes are in fluid communication with corresponding outlet holes via the second group of second inner holes, and the first group of second inner holes are in fluid communication with the inlet holes via the first group of first inner holes, and the second group of second inner holes are in direct fluid communication with corresponding outlet holes. The filter further comprises a second channel region and a third channel region, the second channel region comprising a plurality of second channels extending at an angle to the main axis, and the third channel region comprising a plurality of third channels extending at an angle to the main axis; each first channel communicates with at least one of the inlet holes and at least one of the second group of first inner holes; each second channel communicates with at least one of the first group of first inner holes and at least one of the second group of second inner holes; and each third channel communicates with at least one of the first group of second inner holes and at least one of the outlet holes.

According to another embodiment, the first substrate is a first outer substrate, the second substrate is a second outer substrate, the channel region is a first channel region, and the channels of the first channel region are first channels; the filter further comprises a first inner substrate and a second inner substrate stacked between the first outer substrate and the second outer substrate, the first inner substrate comprising an array of first inner holes passing through the first inner substrate and the second inner substrate comprising an array of second inner holes passing through the second inner substrate, wherein the first inner holes are in direct fluid communication with neither the inlet holes nor the second inner holes, and the second inner holes are in direct fluid communication with neither the first inner holes nor the outlet holes; the filter further comprises a second channel region and a third channel region, the second channel region comprising a plurality of second channels extending at an angle to the main axis, and the third channel region comprising a plurality of third channels extending at an angle to the main axis; each first channel communicates with at least one of the inlet holes and at least one of the first inner holes; each second channel communicates with at least one of the first inner holes and at least one of the second inner holes; each third channel communicates with at least one of the second inner holes and at least one of the outlet holes; and the first channels have a first critical dimension, the second channels have a second critical dimension less than the first critical dimension, and the third channels have a third critical dimension less than the second critical dimension.

According to another embodiment, a fluid conduit includes: a conduit body comprising an inlet end, an outlet end, and a lumen extending from the inlet end to the outlet end; and a filter according to any of the embodiments disclosed herein, wherein the filter is positioned at a location selected from the group consisting of: the inlet end; the outlet end; and a location in the lumen between the inlet end and the outlet end.

According to another embodiment, a chromatography column includes: a column body comprising an inlet end and an outlet end, and an internal column bore extending from the inlet end to the outlet end; and a filter according to any of the embodiments disclosed herein, wherein the filter is positioned at the inlet end or the outlet end. In an embodiment, one such filter is positioned at the inlet end, and another such filter is positioned at the outlet end. In an embodiment, a stationary phase is retained between the two filters.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

FIG. 18 is a schematic view of an example of a fluidic system that may include one or more filters as disclosed herein.

DETAILED DESCRIPTION

Figure 1A:
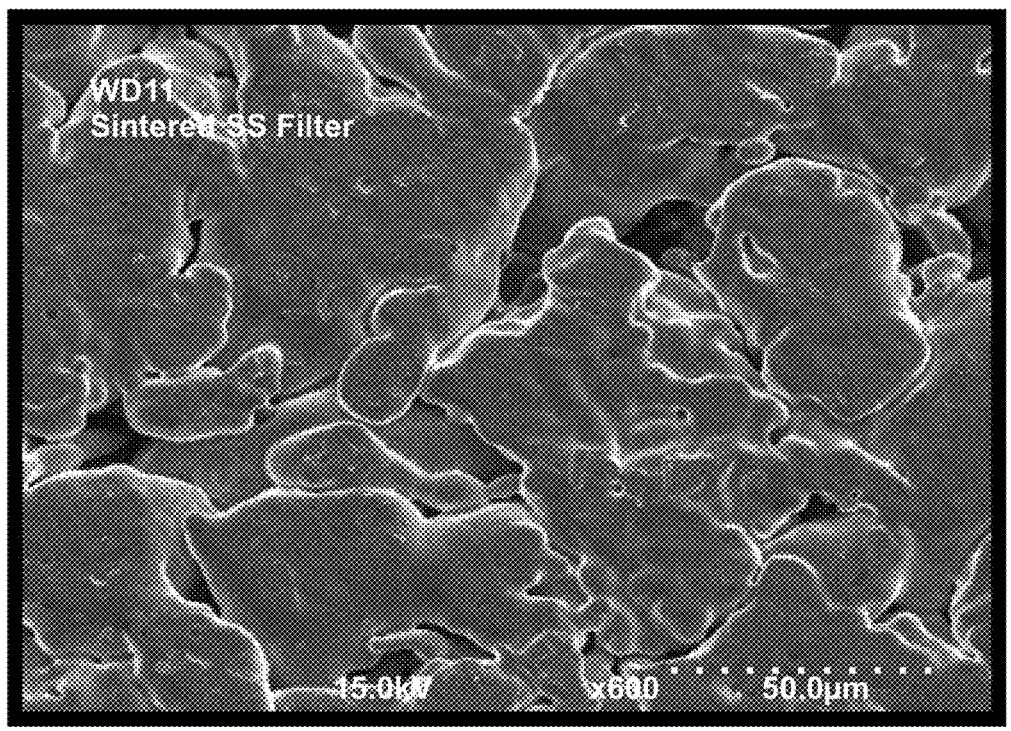
FIG. 1A is a scanning electron microscope (SEM) image of a top view of a region of a conventional sintered stainless steel (SS) frit with the specification of 0.3 µm porous grade.

In the present disclosure, the terms "filter" and "frit" are used interchangeably, unless specified otherwise or the context dictates otherwise.

As used herein, the term "fluid" is used in a general sense to refer to any substance that is flowable through a conduit. Thus, the term "fluid" may generally refer to a liquid, a gas, or a supercritical fluid, unless specified otherwise or the context dictates otherwise.

As used herein, the term "liquid" generally encompasses a liquid having a single-compound composition, or a mixture of two or more different liquids such as, for example, two or more different solvents. A liquid may be a solution, a suspension, a colloid, or an emulsion. Solid particles and/or gas bubbles may be present in the liquid.

As used herein, the term "conduit" generally refers to any type of structure enclosing an interior space that defines a repeatable path for fluid to flow from one point (e.g., an inlet of the conduit) to another point (e.g., an outlet of the conduit). Examples of conduits include, but are not limited to, tubes, capillaries, ports, chambers, fluidic couplings, etc. The cross-section (or flow area) of the conduit may be round (e.g., circular, elliptical, etc.), polygonal (e.g., square, rectilinear, etc.), a combination of round and polygonal features.

As used herein, the term "filter passage" generally refers to any passage defining a fluid flow path through at least a portion of a filter (or frit) as described herein. Examples of filter passages include, but are not limited to, holes (e.g., pores, bores, etc.) and channels. The cross-section (or flow area) of the filter passage may be round (e.g., circular, elliptical, etc.), polygonal (e.g., square, rectilinear, etc.), a combination of round and polygonal features, or a combination of different types of round features or different types of polygonal features. Examples of cross-sections having a combination of features include, but are not limited to, a slot with rounded ends (or a racetrack shape), a "T" shape, a cross shape, etc.

In some embodiments, the internal bore or lumen of a conduit or filter passage may have a micro-scale cross-sectional dimension, i.e. a cross-sectional dimension on the order of micrometers (μm), for example about 1000 μm (1 mm) or less. Such a conduit or filter passage may be referred to as a microfluidic (or micro-scale) conduit or microfluidic (or micro-scale) filter passage. For example, a microfluidic filter passage may be a microfluidic hole (or pore) or a microfluidic channel.

As used herein, the term "microfluidic conduit" or "microfluidic filter passage" also encompasses a conduit or filter passage that has a nano-scale cross-sectional dimension, i.e. a cross-sectional dimension on the order of nanometers (nm), for example about 1000 nm (1 μm) or less. Thus, for example, the cross-sectional dimension of a micro-scale conduit or filter passage may be in a range from about 100 nm to about 1000 μm.

As used herein, the term "cross-sectional dimension" refers to a type of dimension that is appropriately descriptive for the shape of the cross-section of the conduit or filter passage—for example, diameter in the case of a circular cross-section, major axis in the case of an elliptical cross-section, or a maximum length (or width or height) between two opposing sides in the case of a polygonal cross-section. Additionally, the cross-section of the conduit or filter passage may have an irregular shape, either deliberately or as a result of the limitations of fabrication techniques. The cross-sectional dimension of an irregularly shaped cross-section may be taken to be the dimension characteristic of a regularly shaped cross-section that the irregularly shaped cross-section most closely approximates (e.g., diameter of a circle, major axis of an ellipse, length of a polygonal side, etc.).

Fluid flow rates through a conduit or filter passage of micro-scale cross-sectional dimension may be on the order of milliliters per minute (mL/min), microliters per minute (µL/min), or nanoliters per minute (nL/min).

As used herein, the term "line" (or "fluid line") may refer to a single fluidic component that defines a fluid flow path from one point to another point, or two or more fluidic components that collectively define a fluid flow path. The fluidic components making up a given fluid line may be a combination of different types of fluidic components, wherein adjacent fluidic components are fluidly coupled to each other. Examples of fluidic components include, but are not limited to, conduits, filters, chambers, flow cells, pumps, metering devices, valves, columns, flow controlling devices, fluid measurement (e.g., flow rate, pressure, temperature, concentration, etc.) devices, fittings, unions, flow combiners, and flow splitters.

As used herein, the term "microfluidic device" generally refers to a device having one or more micro-scale features such as micro-scale conduits or filter passages.

The present disclosure describes filters (or frits) engineered to exhibit micro-scale fluid filter passages (e.g., holes and channels) of highly precise and uniform dimensions. The filters provide a filtering function, in that particles larger than the critical dimension of the filter channels (as described below) cannot pass through the filter. The filtering function may also be implemented as a retaining function. For example, two filters may be utilized as frits in a liquid chromatography (LC) column to retain a packed bed of particles (i.e., a stationary phase) between the two filters. In such an application, the filters allow a fluid (e.g., a mobile phase consisting of one or more solvents and a sample material to be analytically separated by the LC column) to pass through the LC column while preventing the particles of the stationary phase from escaping the LC column at either the inlet end or the outlet end. In LC applications, a goal is to provide a filter having small filter channels in the range of a few micrometers or less and offering enough mechanical strength to withstand the pressures commonly encountered in LC applications. One or more embodiments of a filter as described herein achieve such a goal. A filter as described herein may include an arrangement of filter passages configured to provide a very uniform flow distribution, which is highly desired in the case of LC columns as appreciated by persons skilled in the art. A filter as described herein may include an arrangement of filter passages configured to provide a high volumetric flow capacity. A filter as described herein may include graduated sizes of the critical dimension of the filter channels. For example, the sizes of the critical dimension may be progressively smaller through the thickness of the filter as fluid flows from the inlet side to the outlet side of the filter.

Figure 5A:
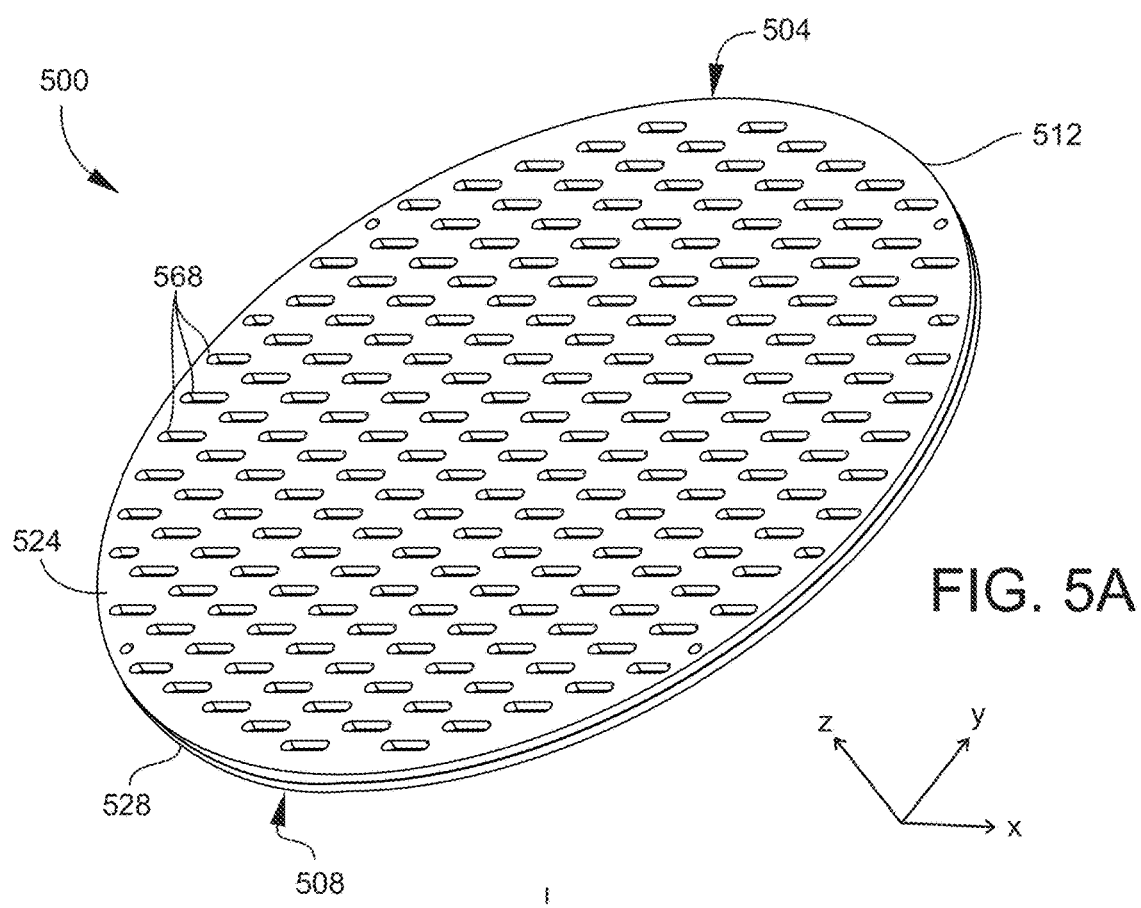
FIG. 5A is a perspective view of an example of a filter according to one embodiment of the present disclosure.
Figure 5B:
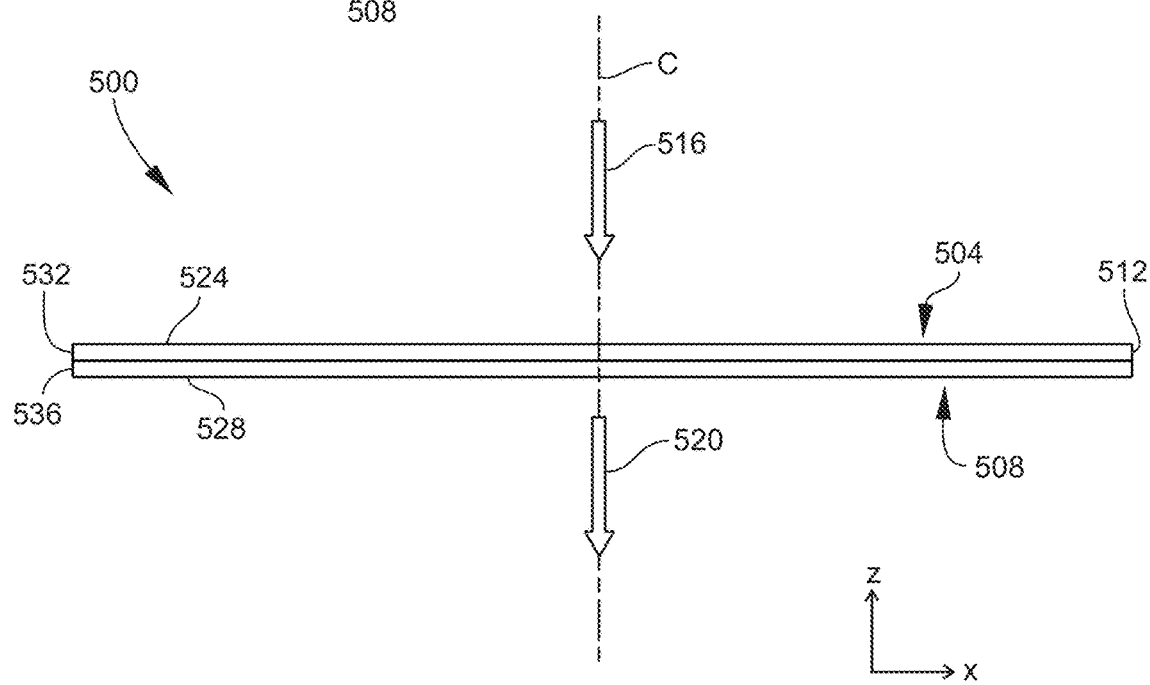
FIG. 5B is a side elevation view of the filter illustrated in FIG. 5A.

FIG. 5A is a perspective view of an example of a filter 500 according to one embodiment of the present disclosure. FIG. 5B is a side elevation view of the filter 500. For descriptive purposes, FIGS. 5A and 5B include a Cartesian (x-y-z) coordinate frame of reference, the origin of which has been arbitrarily positioned relative to the filter 500. The z-axis may be referred to herein as a main axis (or filter axis) C, of the filter 500, which typically is the central axis of symmetry of the filter 500. The thickness of the filter 500 is defined along the main axis C. The x-y plane orthogonal to the z-axis may be referred to herein as the transverse plane. The transverse cross-sectional area of the filter 500 is defined in the transverse plane. The x-axis may be referred to herein as the first transverse axis, and the y-axis may be referred to herein as the second transverse axis.

The filter 500 generally includes an inlet side 504 and an outlet side 508 axially spaced from the inlet side 504 along the main axis C. The filter 500 generally includes a body 512 having a planar geometry. By "planar" is meant that the cross-sectional dimension of the body 512 (e.g., diameter in the case of a disk) in the transverse plane is the dominant dimension defining the overall physical size or footprint of the body 512 (and thus the filter 500), as compared to the typically much smaller thickness of the body 512. The body 512 provides a plurality of fluid flow paths through its thickness, as described further below. In use, unfiltered fluid 516 is received at the inlet side 504 and flows through the fluid flow paths of the body 512, and resulting filtered fluid 520 flows out from the outlet side 508.

The body 512 includes a first outside surface 524, and a second outside surface 528 axially spaced from the first outside surface 524 along the main axis C and parallel to the first outside surface 524. The main axis C is orthogonal to the first outside surface 524 and the second outside surface 528. Thus, the axial distance from the first outside surface 524 to the second outside surface 528 defines the overall axial thickness of the body 512 (and thus the filter 500).

In an embodiment, the body 512 includes a first substrate (or layer) 532 and a second substrate (or layer) 536. The first substrate 532 includes the first outside surface 524, and the second substrate 536 includes the second outside surface 528. In some embodiments, the body 512 may further include one or more additional, intermediate substrates or layers between the first substrate 532 and the second substrate 536. Providing multiple substrates or layers may facilitate fabrication of the filter 500, and increase the fluid flow capacity (e.g., volumetric fluid flow rate, mL/min) of the filter 500.

Figure 6A:
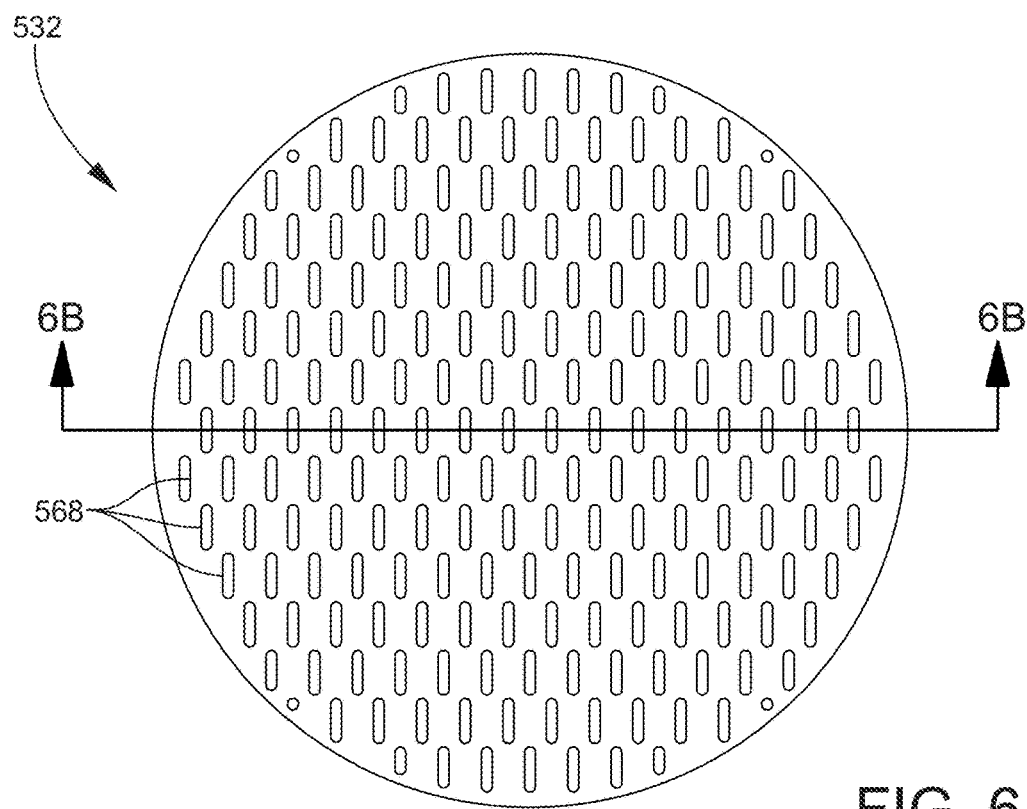
FIG. 6A is a top plan view of a first substrate illustrated in FIG. 5A.
Figure 6B:
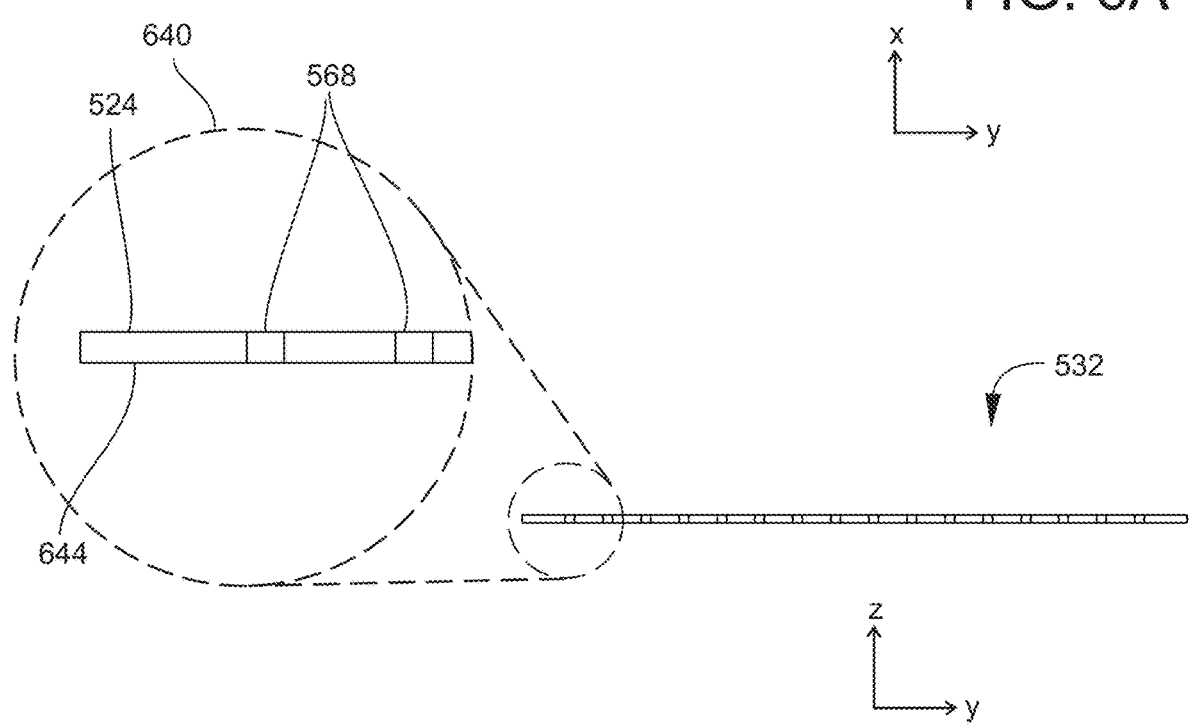
FIG. 6B is a cross-sectional side elevation view of the first substrate illustrated in FIG. 6A, taken along line 6B-6B in FIG. 6A.

FIG. 6A is a top plan view of the first substrate 532. FIG. 6B is a cross-sectional side elevation view of the first substrate 532, taken along line 6B-6B in FIG. 6A. As best shown in a magnified section 640 of FIG. 6B, the first substrate 532 includes a first inside surface 644 axially spaced from the first outside surface 524 along the main axis C and parallel to the first outside surface 524. The first substrate 532 further includes an array (or pattern) of fluid inlet holes 568. The fluid inlet holes 568 are through-holes that extend through the thickness of the first substrate 532 from the first outside surface 524 to the first inside surface 644. In the illustrated embodiment, the inlet holes 568 have an elongated dimension along one axis (x-axis or y-axis) in the transverse plane. For example, the inlet holes 568 may be shaped as slots. The slots may have rounded ends (i.e., racetrack-shaped, as illustrated) or straight ends (i.e., the slots may have a rectilinear shape). In other embodiments, the cross-section of the inlet holes 568 may have a round geometry (e.g., circular, oval, etc.) or a polygonal geometry.

Figure 7A:
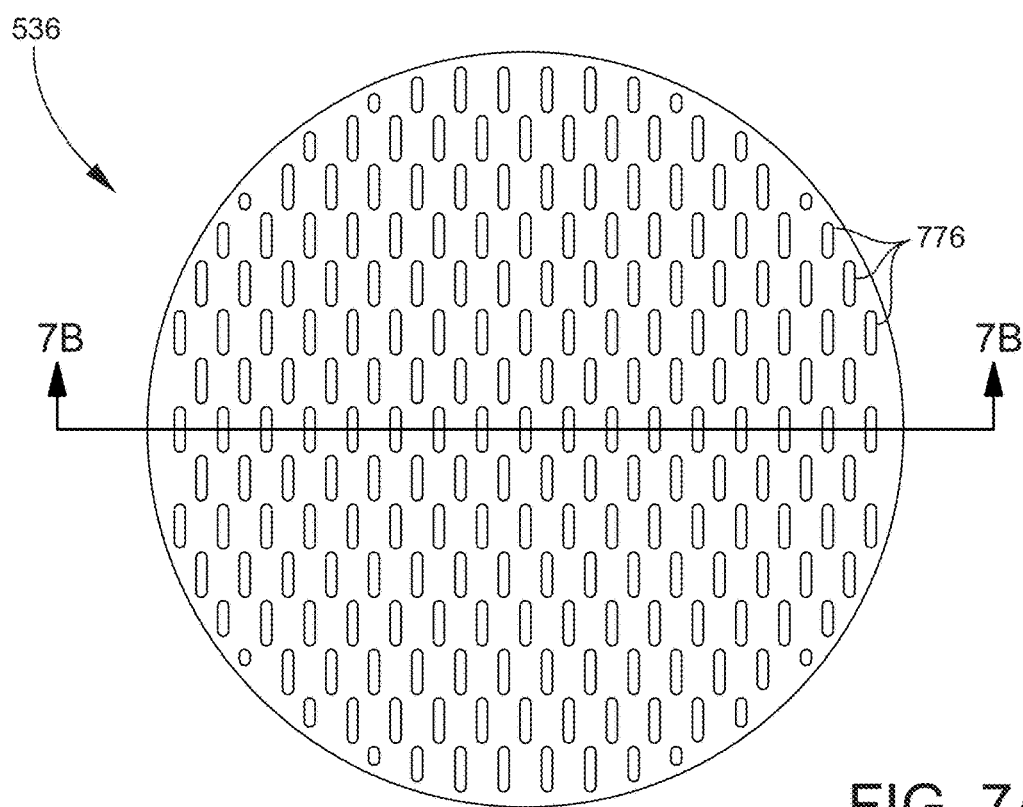
FIG. 7A is a top plan view of a second substrate illustrated in FIG. 5A.
Figure 7B:
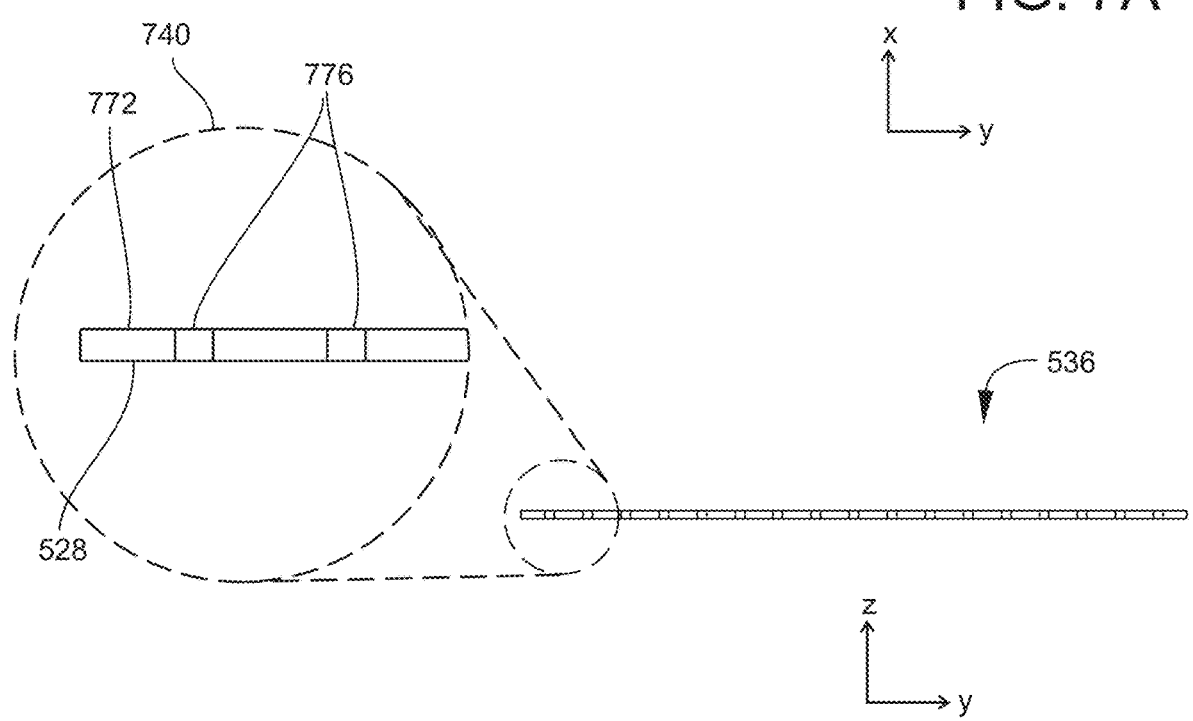
FIG. 7B is a cross-sectional side elevation view of the second substrate illustrated in FIG. 7A, taken along line 7B-7B in FIG. 7A.

FIG. 7A is a top plan view of the second substrate 536. FIG. 7B is a cross-sectional side elevation view of the second substrate 536, taken along line 7B-7B in FIG. 7A. As best shown in a magnified section 740 of FIG. 7B, the second substrate 536 includes a second inside surface 772 axially spaced from the second outside surface 528 along the main axis C and parallel to the second outside surface 528. In the assembled or fabricated form of the filter 500, the second inside surface 772 faces the first inside surface 644 of the first substrate 532 (FIG. 6B). The second substrate 536 includes an array (or pattern) of fluid outlet holes 776. The fluid outlet holes 776 are through-holes that extend through the thickness of the second substrate 536 from the second inside surface 772 to the second outside surface 528. In the illustrated embodiment, the outlet holes 776 have an elongated dimension along one axis (x-axis or y-axis) in the transverse plane. For example, the outlet holes 776 may be shaped as slots. In other embodiments, the cross-section of the outlet holes 776 may be rounded (e.g., circular, oval, etc.) or polygonal.

The configuration of the second substrate 536, including the array of through-holes, may be generally the same as or similar to the configuration of the first substrate 532. For example, the inlet holes 568 and the outlet holes 776 may be elongated along the same axis in the transverse plane. In the present embodiment, the positions of the inlet holes 568 in the transverse plane are spatially (or physically) offset from the positions of the outlet holes 776 so that the inlet holes 568 and outlet holes 776 are not in direct fluid communication with each other. As described further below, the filter 500 includes filter channels in an intermediate region that provide fluid communication between the inlet holes 568 and the outlet holes 776.

Figure 8:
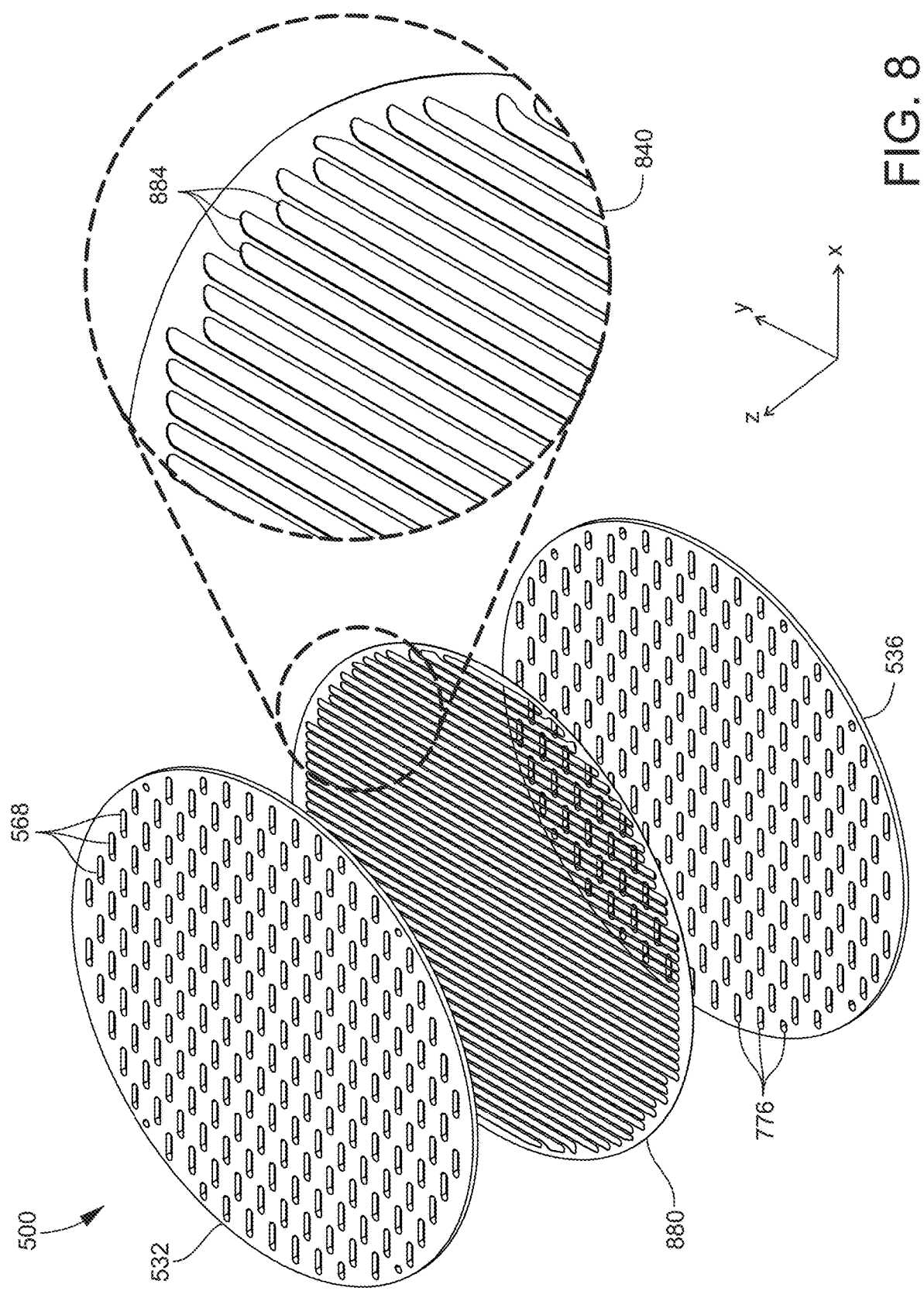
FIG. 8 is an exploded view of the filter illustrated in FIG. 5A, in which a first substrate and a second substrate are separated from each other along a main axis C (z-axis).

FIG. 8 is an exploded view of the filter 500 in which the first substrate 532 and the second substrate 536 are separated from each other along the main axis C (z-axis). As best shown in a magnified section 840 of FIG. 8, the filter 500 includes an intermediate channel region or layer 880 between the first substrate 532 and the second substrate 536. The intermediate region 880 includes a plurality of filter channels 884 running in a plane at an angle to the main (C or z) axis (and to the inlet holes 568 and outlet holes 776, which are parallel to the main axis). In one embodiment and as illustrated, the angle is ninety degrees (90°) to the main (C or z) axis, i.e., the filter channels 884 are orthogonal relative to the main (C or z) axis (i.e., in the transverse, or x-y, plane). This configuration may be desirable for ease of fabrication and stacking up of multiple layers of filter channels between the first substrate 532 and the second substrate 536. In other embodiments, the angle may be less than or greater than ninety degrees relative to the main axis, i.e., the filter channels 884 may be sloped or tilted relative to the transverse plane. The array of filter channels 884 is configured such that each channel 884 communicates with at least one of the inlet holes 568 and at least one of the outlet holes 776. By this configuration, the filter 500 provides a plurality of fluid flow paths through the body 512 from the inlet side 504 to the outlet side 508. Each flow path runs from at least one of the inlet holes 568 to at least one of the filter channels 884, and from at least one channel 884 to at least one of the outlet holes 776. Moreover, because the inlet holes 568 and outlet holes 776 extend along the main axis C (z-axis) while the filter channels 884 extend at an angle to the main axis, each flow path includes a (first) angled transition or turn from the corresponding inlet hole 568 to the corresponding channel 884, and another (second) angled transition or turn from the channel 884 to the corresponding outlet hole 776. In the illustrated embodiment in which the filter channels 884 extend along the transverse plane orthogonal to the main axis C (z-axis), each flow path includes a (first) ninety-degree transition from the corresponding inlet hole 568 to the corresponding channel 884, and another (second) ninety-degree transition from the channel 884 to the corresponding outlet hole 776. As illustrated, the filter channels 884 may extend along the transverse (or other angled) plane in parallel with each other.

In the embodiment specifically illustrated, the filter channels 884 span a majority of the cross-sectional dimension of the first substrate 532 and second substrate 536. This configuration enables each channel 884 to communicate with multiple inlet holes 568 and multiple outlet holes 776, whereby each channel 884 may be part of multiple fluid flow paths through the filter 500.

In the embodiment specifically illustrated in which the inlet holes 568 and outlet holes 776 are elongated slots, the filter channels 884 run in a direction in the transverse plane orthogonal to the direction in the transverse plane along which the inlet holes 568 and outlet holes 776 run. For example, the inlet holes 568 and outlet holes 776 may run along a first transverse axis (e.g., the x-axis) while the filter channels 884 run along a second transverse axis (e.g., the y-axis). This configuration enables each inlet hole 568 and each outlet hole 776 to communicate with multiple filter channels 884.

Figure 9:
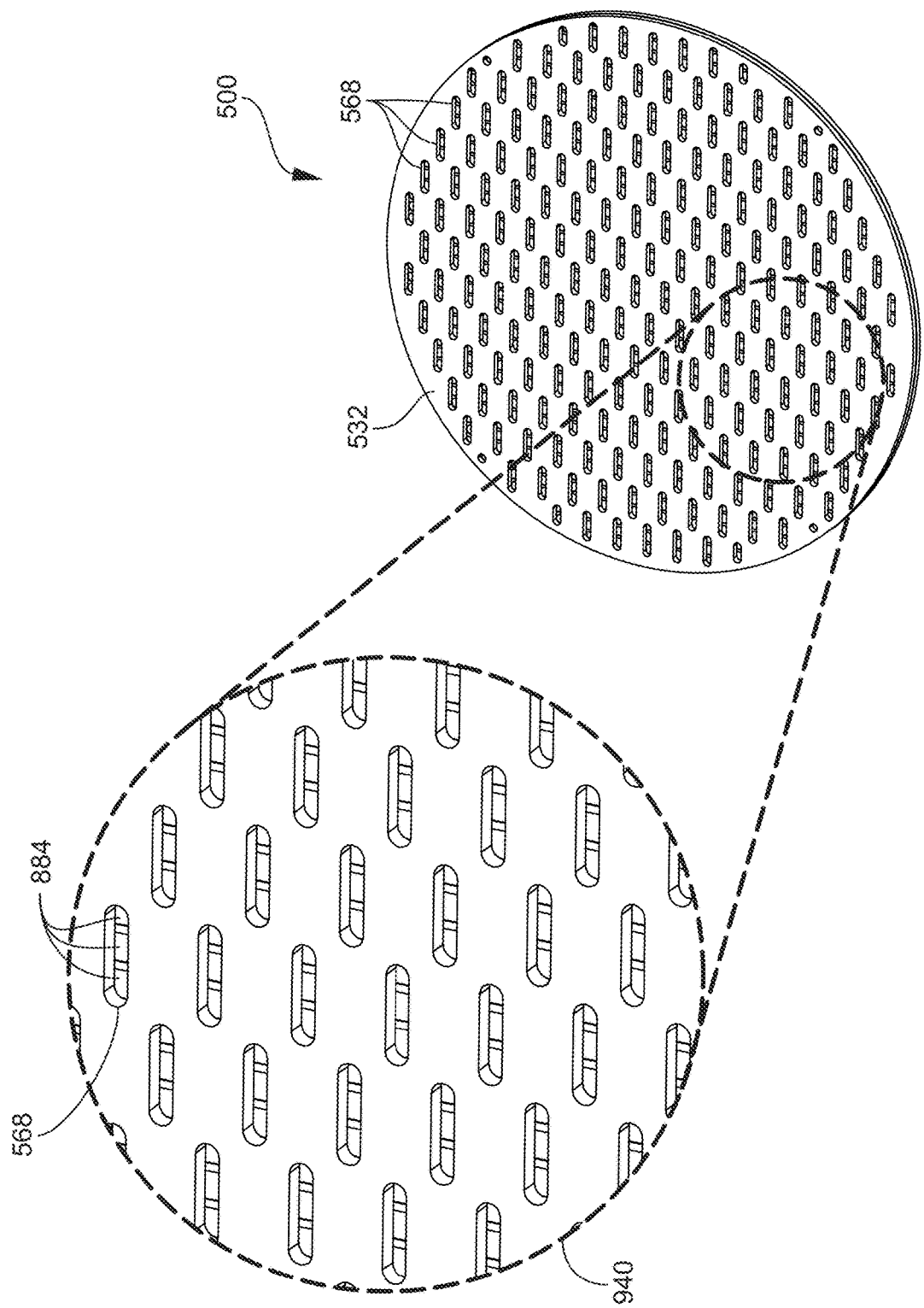
FIG. 9 is another perspective view of the filter illustrated in FIG. 5A, specifically from the perspective of a first substrate thereof.

FIG. 9 is another perspective view of the filter 500, specifically from the perspective of the first substrate 532. In the present embodiment, as best shown in a magnified section 940 of FIG. 9, each inlet hole 568 when provided as an elongated slot may communicate with multiple filter channels 884 (three channels 884 in the illustrated example). Hence, a fluid flow path running through a given inlet hole 568, upon transitioning to the intermediate region 880, may be split into multiple flow paths through multiple respective filter channels 884. Moreover, the fluid entering a given channel 884 from a corresponding inlet hole 568 may be split into two flow paths running in opposite directions along that channel 884.

FIG. 9 may also be representative of a perspective view of the filter 500 from the perspective of the second substrate 536. In the present embodiment, multiple filter channels 884 (three channels 884 in the illustrated example) may communicate with a single outlet hole 776, whereby multiple fluid flow paths merge at each outlet hole 776.

Figure 10:
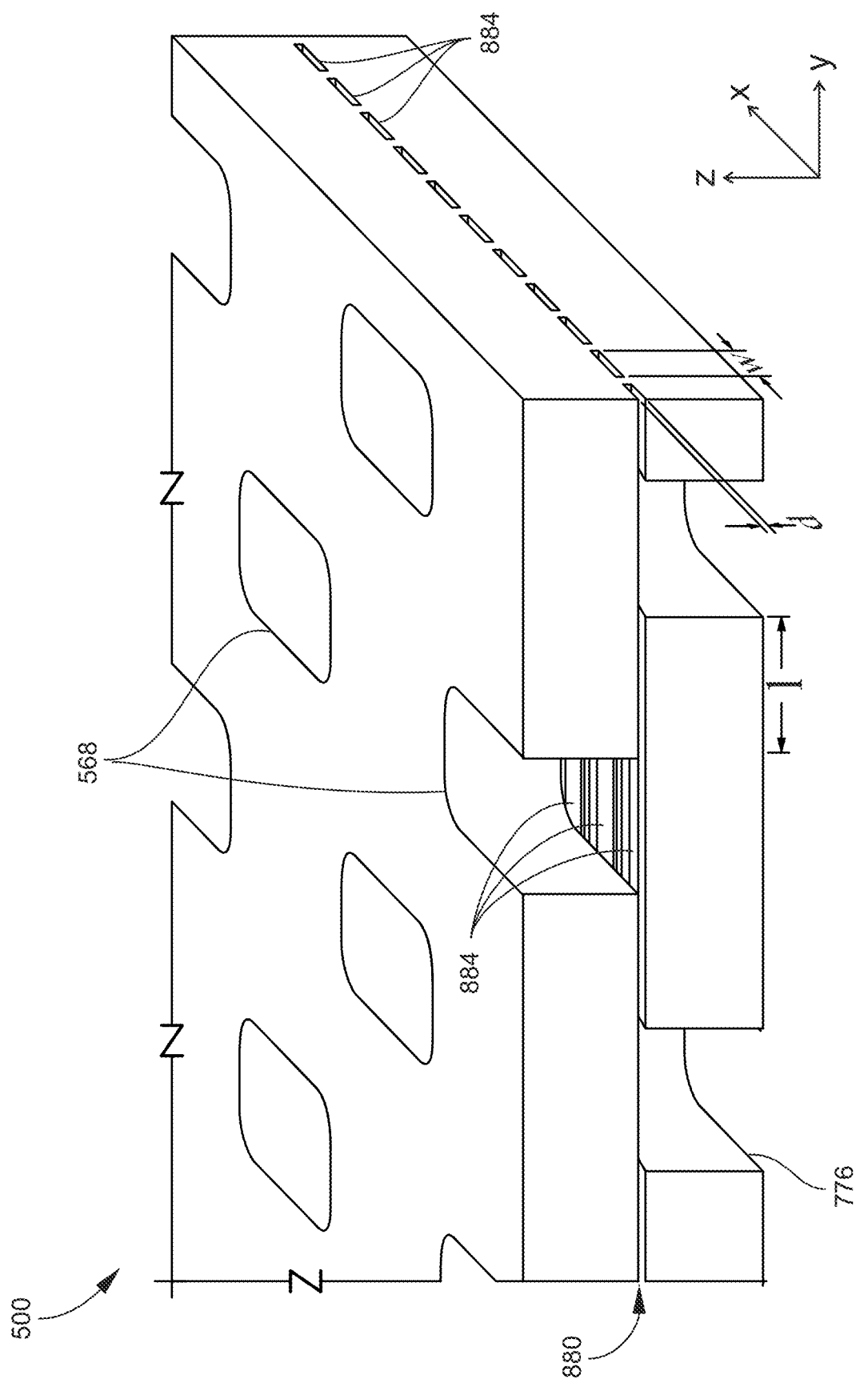
FIG. 10 is cut-away perspective view a section of the filter illustrated in FIG. 5A.

FIG. 10 is a cut-away perspective view of a section of the filter 500. As shown in FIG. 10, the outlet holes 776 are not in direct fluid communication with the inlet holes 568. Instead, the outlet holes 776 fluidly communicate with the inlet holes 568 via the intervening filter channels 884. In the context of the present disclosure, the feature "not in direct fluid communication" means that the outlet holes 776 do not have a direct line of sight along the main axis C with the inlet holes 568. In the present embodiment, the feature "not in direct fluid communication" is realized by the offset positioning of the inlet holes 568 above the filter channels 884 relative to the outlet holes 776 below the filter channels 884. In other words, the inlet holes 568 and the outlet holes 776 are not aligned with each other. The feature "not in direct fluid communication" may also be characterized by the fluid flow paths from the inlet holes 568 to the outlet holes 776 including at least two turns. Thus in the present embodiment, a given flow path passes through an inlet hole 568 along (or parallel to) the main axis, then turns into a channel 884 and passes through the channel 884 at an angle to the main axis, then turns into an outlet hole 776 and passes through the outlet hole 776 along (or parallel to) the main axis.

The inlet holes 568, the outlet holes 776, and the filter channels 884 each have a depth defined along the main axis C (z-axis). The depth of the filter channels 884 is designated d in FIG. 10. When configured as slots, the inlet holes 568 and the outlet holes 776 have a length (elongated dimension) along an axis (e.g., the first transverse axis, or x-axis) in the transverse plane. The filter channels 884 have a length (elongated dimension) along an axis (e.g., the second transverse axis, or y-axis) in the transverse plane, and a width w along an axis (e.g., the first transverse axis, or x-axis) orthogonal to the length. In the present embodiment, the filter channels 884 may be characterized as "horizontal" in that their width w in the transverse plane is significantly (or predominantly, or appreciably) greater than their depth d along (parallel to) the main (z) axis. In the present context, the term "significantly" means that the filter channels 884 are observed (as may be aided by microscopic imaging) to be horizontally oriented in the manner described in this paragraph. In one non-exclusive example, the width w of the filter channels 884 is two times or more greater than their depth d. In the case of horizontal filter channels 884 as illustrated, the depth of the filter channels 884 is less than the minimum particle size, i.e., the minimum size of the particles intended to be retained and not passed through the filter 500. That is, the depth of the filter channels 884 is the critical dimension (described further below) of the embodiment of the filter 500 shown in FIG. 10. In one embodiment in which the inlet holes 568 and the outlet holes 776 are configured as slots, the slot length of the inlet holes 568 and the outlet holes 776 is greater than the width of the filter channels 884, as described above.

In one non-exclusive example, the inlet holes 568, the outlet holes 776, and the filter channels 884 have the following dimensions. The inlet holes 568 and the outlet holes 776 have a depth in a range from 10 to 1000 μm. The inlet holes 568 and the outlet holes 776 may have a cross-sectional dimension (e.g., diameter) in a range from 20 to 200 μm. When configured as slots, the inlet holes 568 and the outlet holes 776 have a length in a range from 50 to 500 μm. The filter channels 884 have a depth in a range from 0.5 to 50 μm, a length in a range from 5 to 100 μm, and a width in a range from 0.5 to 100 μm.

In an embodiment, the inlet holes 568 are uniformly spaced from each other in the transverse plane, the outlet holes 776 are uniformly spaced from each other in the transverse plane, and the filter channels 884 are uniformly spaced from each other in the transverse plane.

As described above, the filter 500 may be characterized as including an intermediate region 880 "between" the first substrate 532 and the second substrate 536. The intermediate region 880 is the portion of the filter 500 that includes a plurality of filter channels 884. In one embodiment, the intermediate region 880 is integral with the first substrate 532. For example, the filter channels 884 of the intermediate region 880 may be formed on the first inside surface 644 of the first substrate 532. In another embodiment, the intermediate region 880 is integral with the second substrate 536. For example, the filter channels 884 may be formed on the second inside surface 772 of the second substrate 536.

Figure 11A:
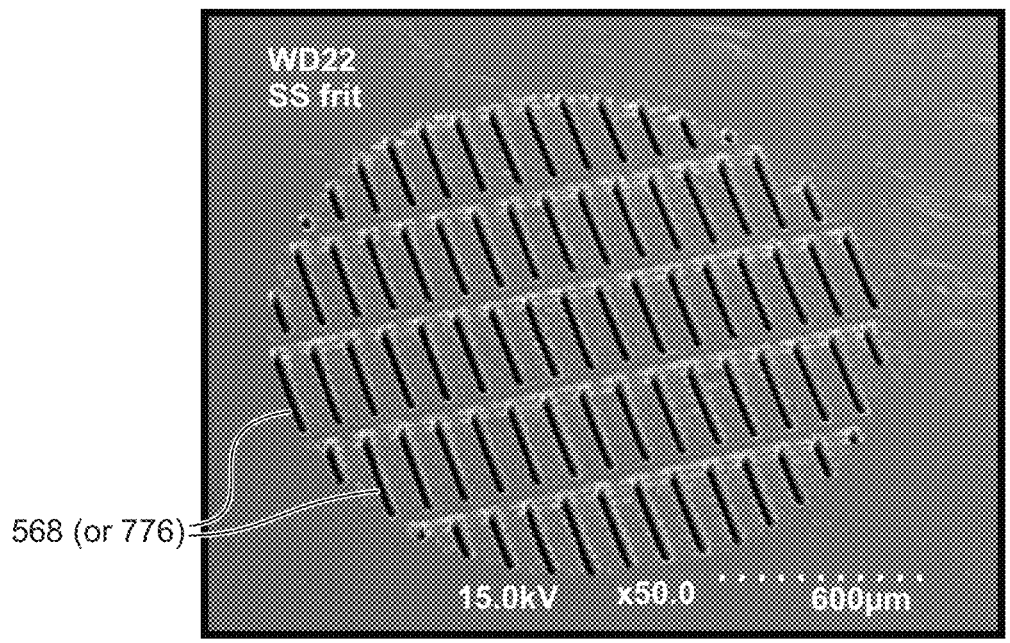
FIG. 11A is a scanning electron micrograph (SEM) in image of a substrate that may be included as part of a body of the filter illustrated in FIG. 5A.
Figure 11B:
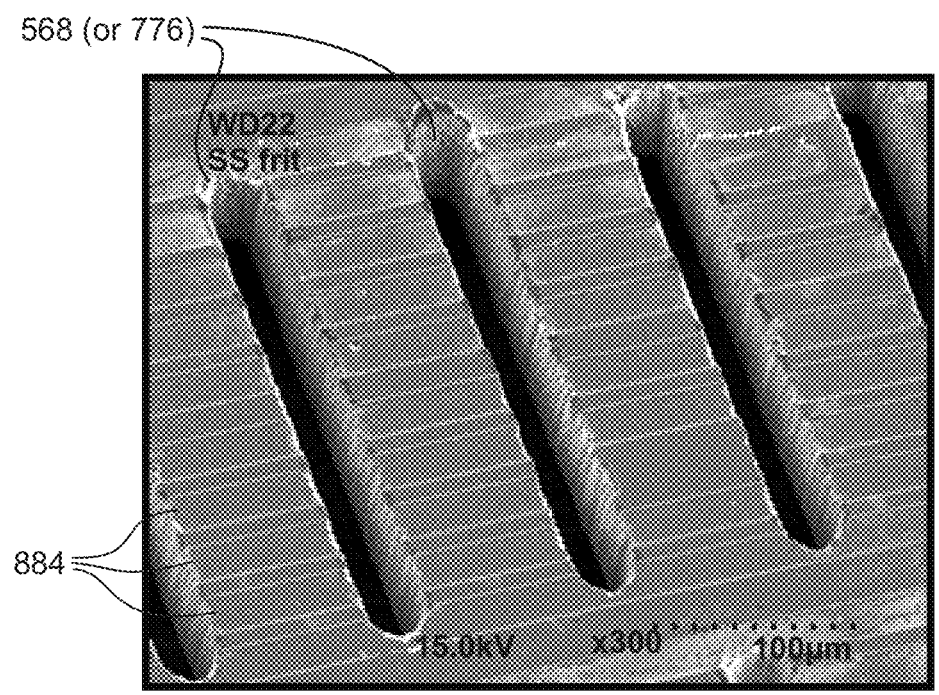
FIG. 11B is a magnified view of a region of the SEM image of FIG. 11A.

FIG. 11A is a scanning electron micrograph (SEM) image of a substrate and intermediate region (where the channels are located or formed) that may be included as part of the body 512 of the filter 500. FIG. 11B is a magnified view of a region of the SEM image of FIG. 11A. As shown, the channels 884 are provided as recesses on either the first inside surface 644 of the first substrate 532 or the second inside surface 772 of the second substrate 536.

In another embodiment, the intermediate region 880 is a distinct layer fabricated separately from and positioned between the first substrate 532 and the second substrate 536. In this case, the intermediate region 880 may be properly aligned with and positioned on either the first inside surface 644 of the first substrate 532 or the second inside surface 772 of the second substrate 536 before attaching the first substrate 532 and the second substrate 536 together.

Figure 12:
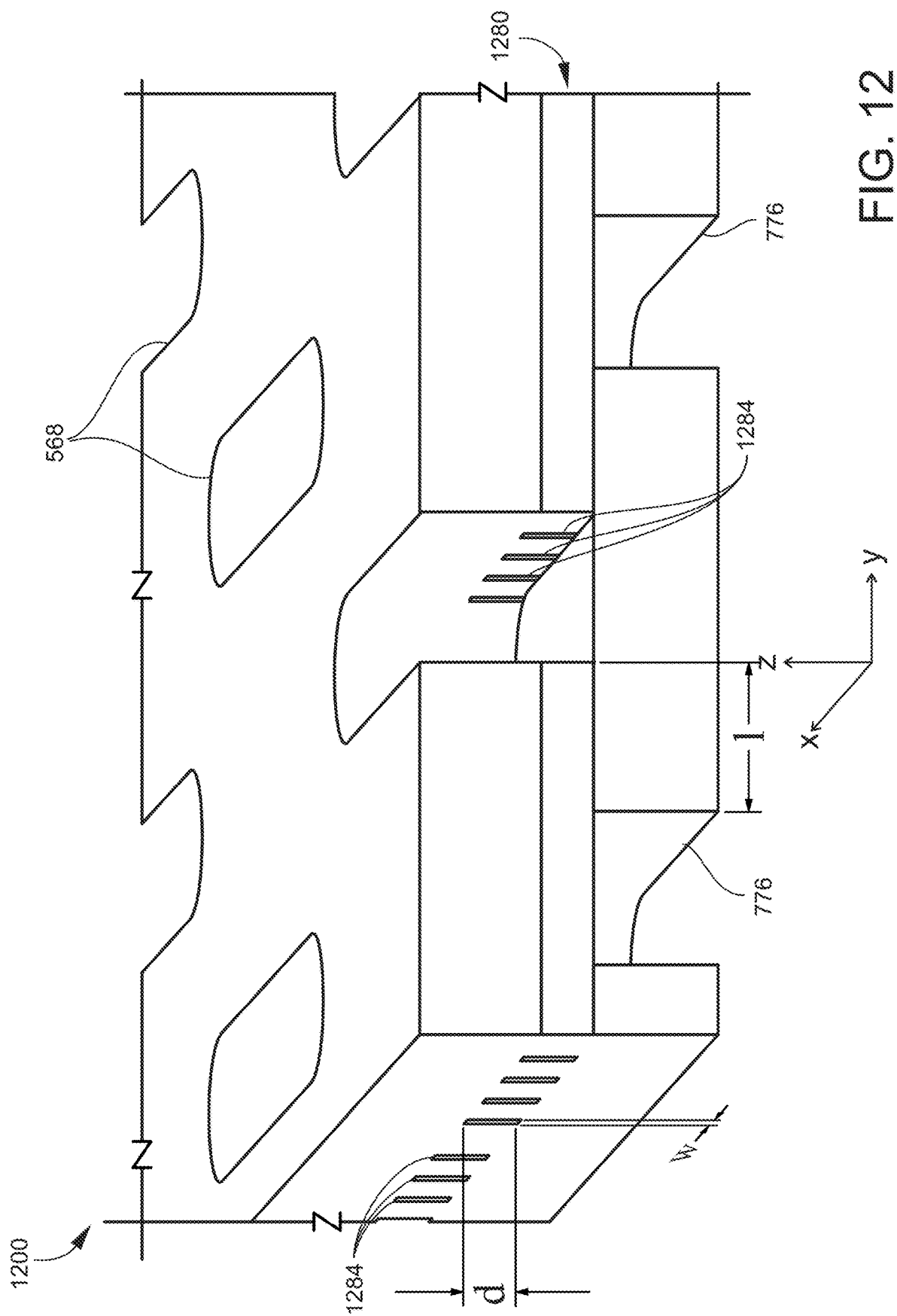
FIG. 12 is a cut-away perspective view of a section of an example of a filter according to another embodiment.

FIG. 12 is a cut-away perspective view of a section of an example of a filter 1200 according to another embodiment. The filter 1200 includes an intermediate channel region 1280 that includes a plurality of filter channels 1284 providing fluidic connections between inlet holes 568 and outlet holes 776 as described elsewhere herein. In the present embodiment, and in comparison to the horizontal filter channels 884 described above in conjunction with FIG. 10, the filter channels 1284 of the filter 1200 may be characterized as "vertical" in that their depth d along (parallel to) the main (z) axis is significantly (or predominantly, or appreciably) greater than their width w in the transverse plane. In the present context, the term "significantly" means that the filter channels 1284 are observed (as may be aided by microscopic imaging) to be vertically oriented in the manner described in this paragraph. In one non-exclusive example, the depth d of the filter channels 884 is two times or more greater than their width w. In the case of vertical filter channels 1284, the width of the filter channels 1284 is less than the minimum particle size to be retained by the filter 1200. That is, the width of the filter channels 1284 is the critical dimension (described further below) of the filter 1200. The filter 1200 may otherwise be similar to the filter 500 having horizontal filter channels 884 described above in conjunction with FIGS. 5A to 11B, and may be fabricated utilizing the same techniques described herein.

As in the embodiment described above and illustrated in FIGS. 5A-10, the outlet holes 776 of the filter 1200 are not in direct fluid communication with the inlet holes 568, but instead are fluidly interconnected by the filter channels 1284. That is, there is no direct line of sight along the main axis C between the inlet holes 568 and the outlet holes 776. In the present embodiment, this feature is again implemented by the outlet holes 776 being spatially (or physically) offset from (i.e., not aligned with) the inlet holes 568. Each fluid flow path includes at least two turns, for example into and out from an interconnecting filter channel 1284.

FIGS. 13A-13D are schematic cross-sectional views of examples of channels that may be disposed in the intermediate region of a filter as described herein, and fluidly interconnect inlet holes and outlet holes of the filter. In each of FIGS. 13A-13D, the direction of fluid flow through the channel is into or out from the plane of the drawing sheet, i.e., along a transverse axis relative to the fluid flow through the inlet and outlet holes that is parallel to the main axis of the filter. In each embodiment, the channel has a critical dimension, which dimension is smaller than the size of the particle to be retained. Thus, the critical dimension determines whether a particle of a certain size can pass through the channel and hence through the filter. The critical dimension depends on the cross-sectional geometry of the channel.

Figure 13A:
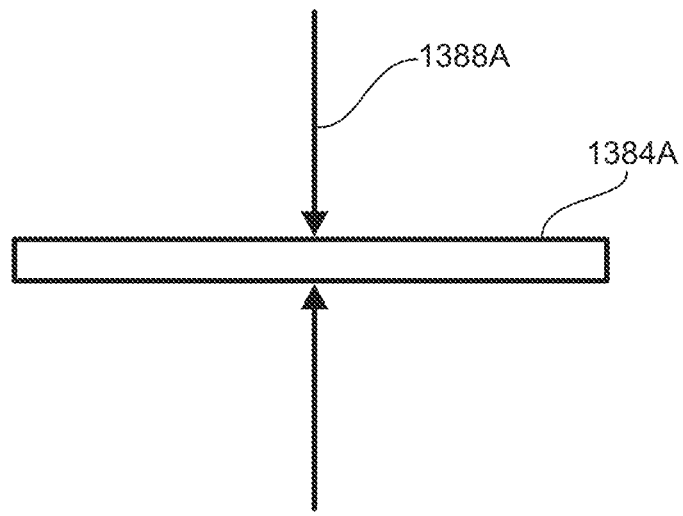
FIG. 13A is a schematic cross-sectional view of an example of a horizontal rectangular channel according to an embodiment.

FIG. 13A illustrates a horizontally oriented rectangular channel 1384A, as described above in conjunction with FIG. 10. The channel 1384A has a critical dimension 1388A, as indicated by arrows. In this case, the critical dimension 1388A is the depth of the channel 1384A, i.e., the dimension along the vertical direction from the perspective of FIG. 13A.

Figure 13B:
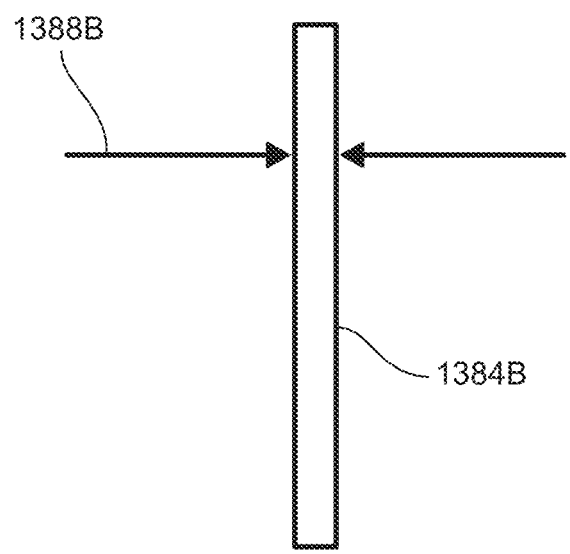
FIG. 13B is a schematic cross-sectional view of an example of a vertical rectangular channel according to an embodiment.

FIG. 13B illustrates a vertically oriented rectangular channel 1384C, as described above in conjunction with FIG. 12. The channel 1384B has a critical dimension 1388B, as indicated by arrows. In this case, the critical dimension 1388B is the width of the channel 1384B, i.e., the dimension along the horizontal direction from the perspective of FIG. 13B.

Figure 13C:
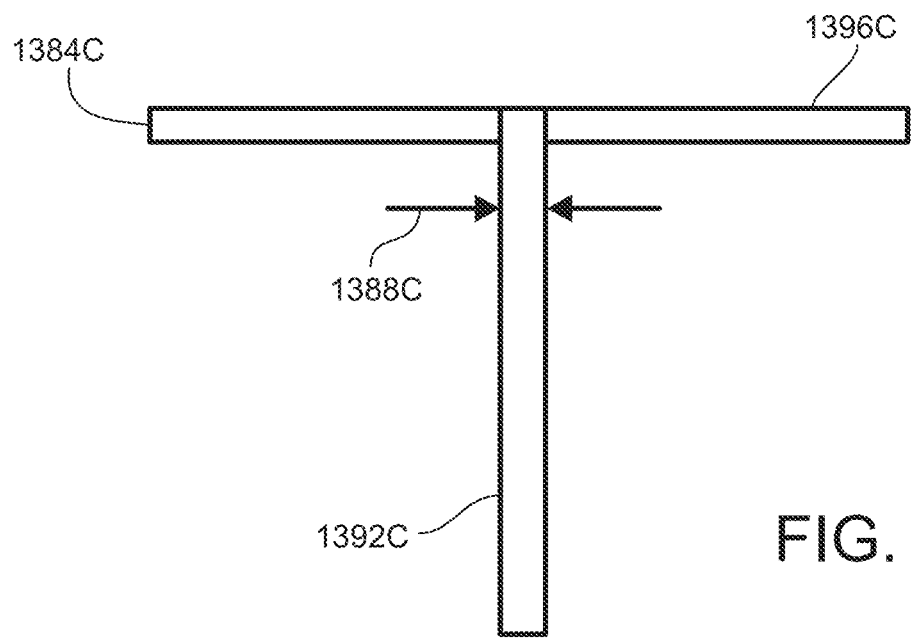
FIG. 13C is a schematic cross-sectional view of an example of a T-shaped channel according to an embodiment.

FIG. 13C illustrates a T-shaped channel 1384C defined by a vertical section 1392C and a horizontal section 1396C. The channel 1384C has a critical dimension 1388C, as indicated by arrows. In this case, the critical dimension 1388C is the width (in the horizontal direction) of the vertical section 1392C. This assumes that the depth (in the vertical direction) of the horizontal section 1396C is not larger than the width of the vertical section 1392C. If the depth of the horizontal section 1396C were larger than the width of the vertical section 1392C, then the critical dimension would be the size of the depth of the horizontal section 1396C.

Figure 13D:
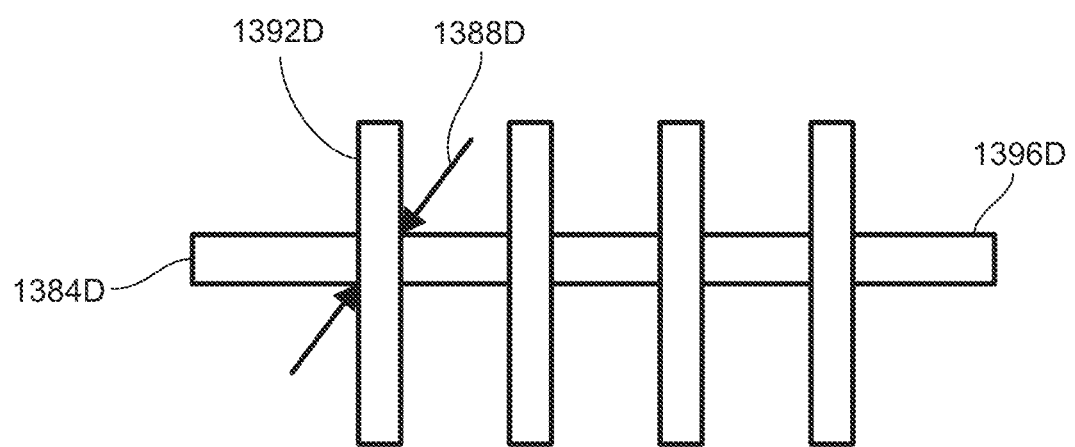
FIG. 13D is a schematic cross-sectional view of an example of a cross-shaped filter channel according to an embodiment.

FIG. 13D illustrates a cross-shaped channel 1384D defined by a horizontal section 1396D intersected by one or more vertical sections 1392D. Each intersection thus has a square-shaped cross-section. The channel 1384D has a critical dimension 1388D, as indicated by arrows. In this case, the critical dimension 1388D is the diagonal between opposing corners of the square-shaped cross-section of each intersection.

Similarly, in an embodiment where a filter channel has a simple square-shaped cross-section (without horizontal and vertical extensions as in the cross-shaped channel 1384D illustrated in FIG. 13D), the critical dimension would be the diagonal between opposing corners of the square-shaped cross-section. Alternatively, a filter channel may have a circular cross-section, in which case the critical dimension would be the diameter of the cross-section.

Generally, the components of the filter 500 (or 1200) may be composed of one or more materials effective for withstanding high fluid pressure regimes as described herein, e.g., in a range of 100 bar or greater, and capable of being engineered to produce high-resolution features such as through-holes and channels as described herein. Examples of such materials include various metals, metal alloys, metalloids (e.g., silicon), ceramics (e.g., glasses), and polymers. A few specific examples include, but are not limited to, stainless steel (SS), titanium, palladium and a nickel-cobalt (NiCo) alloy such as an 80% nickel/20% cobalt alloy. Metals such as palladium are useful for bio-compatible applications.

Generally, the filter 500 may be fabricated by any process suitable for accurately creating high-resolution features on the small scales noted above using materials capable of withstanding the high pressures noted above. Microfabrication processes may be utilized entailing material-additive process steps (e.g., chemical vapor deposition, physical vapor deposition, electro-deposition, electro-plating, diffusion bonding, selective fusing, etc.), material-subtractive process steps (e.g., wet (chemical) etching, electro-chemical machining, dry etching (e.g., plasma etching, deep reactive ion etching (DRIE), laser milling, etc.), stamping, or a combination of the foregoing, such as the type of processes utilized in fields of microfluidics, microelectronics, and micro-electromechanical systems (MEMS). In one non-limiting example, the filter 500 is fabricated by an additive process that utilizes photolithography techniques in combination with electrodeposition of metals. In some embodiments, multiple filters 500 may be fabricated simultaneously as dies on a single substrate (e.g., a 4-inch wafer) and thereafter singulated from the substrate. In some embodiments, the surfaces of the filter 500 (particularly the surfaces exposed to the fluid flow, i.e., the surfaces defining holes and channels) may be deactivated as part of the fabrication process, such as by applying a suitable coating or surface treatment/functionalization that renders the holes and channels chemically inert and/or of low absorptivity to the fluid. Moreover, the surfaces may be treated or functionalized so as to impart or enhance a property such as, for example, anti-stiction, hydrophobicity, hydrophilicity, lipophobicity, lipophilicity, low absorptivity, etc., as needed or desirable for a particular application. Coatings and surface treatments/ functionalizations for all such purposes are readily appreciated by persons skilled in the art.

In some embodiments, the filter 500 may be fabricated utilizing a layer-by-layer metal deposition technique in which internal features (e.g., the filter channels 884) are formed by depositing metal through appropriately patterned photolithographic masks. In such embodiments, the filter 500 may include a plurality of material layers stacked along the main axis C, such as two outer substrates 532 and 536 and one or more intermediate layers between the two outer substrates 532 and 536. In some embodiments, before or after a given layer has been deposited, additional material may be deposited on that layer and in the negative space to provide a supporting structure for the subsequent layer or layers to be deposited. At a later stage of the fabrication, the additional material may be removed from the negative space by an appropriate etching technique or other material removal technique. In some embodiments, features such as through-holes and/or channels may be formed on or in the substrates, and the substrates are thereafter appropriately aligned with each other and attached together. Attachment may entail, for example, bonding (e.g., thermal compression, adhesive, eutectic, anodic, surface activated bonding, etc.), welding, gluing, etc. In some embodiments, an adhesion-promoting layer may be applied to a surface of a substrate or layer prior to attaching another substrate or layer to the first substrate or layer.

Figure 14:
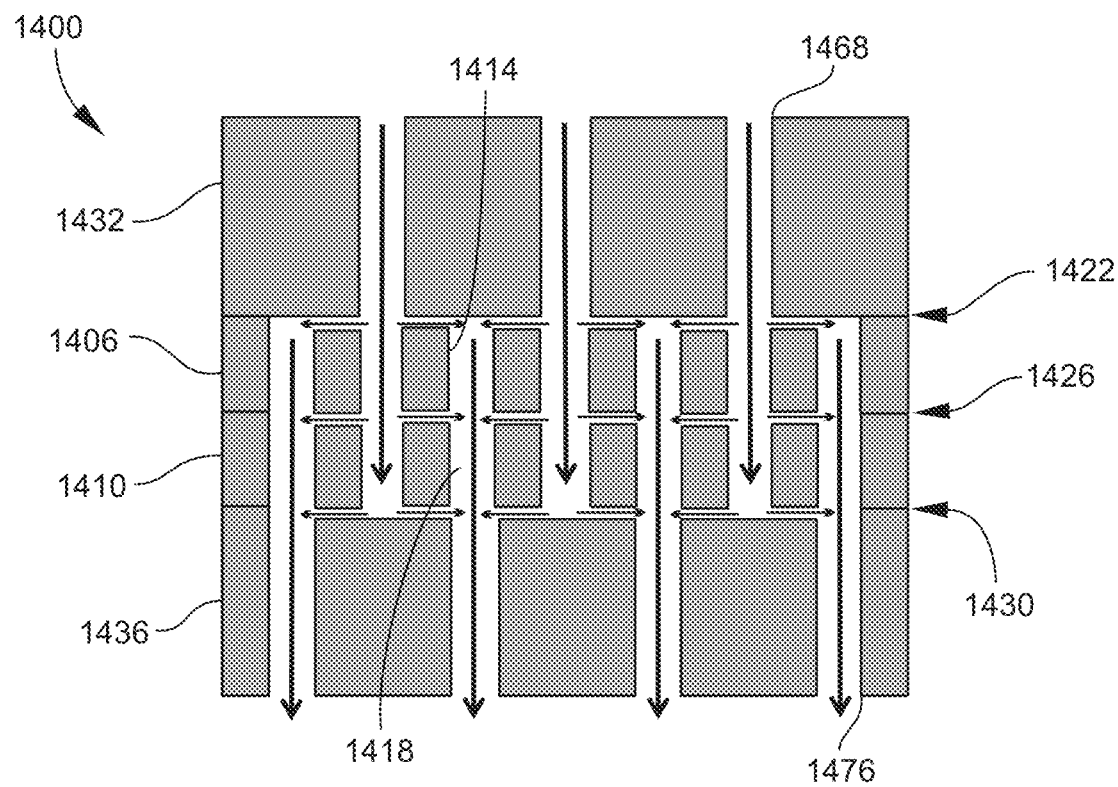
FIG. 14 is a schematic cross-sectional view of an example of a filter according to another embodiment.

FIG. 14 is a schematic cross-sectional view of an example of a filter 1400 according to another embodiment. The filter 1400 may be a multi-stage configuration derived from the basic filter configurations described above in conjunction with FIGS. 5A to 13D.

The filter 1400 includes first (outer) substrate (or layer) 1432 having an array of inlet holes 1468 and a second (outer) substrate (or layer) 1436 having an array of outlet holes 1476. The filter 1400 further includes one or more additional, inner substrates (or layers) between the first (outer) substrate 1432 and the second (outer) substrate 1436 to provide high fluid flow capacity. In the illustrated embodiment, the filter 1400 includes two inner substrates, namely a first inner substrate 1406 and a second inner substrate 1410. The first inner substrate 1406 includes an array or pattern of first inner holes 1414 running through its thickness, and the second inner substrate 1410 includes an array or pattern of second inner holes 1418 running through its thickness. The first inner holes 1414 and second inner holes 1418 are arranged to be part of the plurality of fluid flow paths (e.g., via filter channels) from the of inlet holes 1468 to the outlet holes 1476. Fluid flow through the first inner holes 1414 and the second inner holes 1418, as well as the inlet holes 1468 and the outlet holes 1476, is parallel to the main axis of the filter 1400 as depicted by vertical arrows.

In an embodiment, the number of first inner holes 1414 is greater than either the number of inlet holes 1468 or the number of outlet holes 1476. Likewise, the number of second inner holes 1418 is greater than either the number of inlet holes 1468 or the number of outlet holes 1476. The pattern and number of second inner holes 1418 may be the same as the pattern and number of first inner holes 1414. Corresponding pairs of first inner holes 1414 and second inner holes 1418 may be in direct fluid communication (i.e. in direct line of sight, e.g. aligned) with each other. In an embodiment, the pattern of first inner holes 1414 (and likewise the pattern of second inner holes 1418) may be a combination of the pattern of inlet holes 1468 and the pattern of outlet holes 1476.

In the illustrated embodiment, some (i.e., a first group) of the first inner holes 1414 are in direct fluid communication (i.e. in direct line of sight, e.g. aligned) with corresponding inlet holes 1468 to receive the fluid exiting the first substrate 1432, while the other (i.e., a second group of) first inner holes 1414 are in fluid communication with corresponding outlet holes 1476 via a second group of second inner holes 1418 (and spatially offset from the inlet holes 1468). Also, the first inner holes 1414 and the second inner holes 1418 are in direct fluid communication with each other. Thus, some (i.e., a first group) of the second inner holes 1418 are in fluid communication with the inlet holes 1468 via the first group of first inner holes 1414 (and spatially offset from the outlet holes 1476), while the other (i.e., a second group of) second inner holes 1418 are in direct fluid communication with the outlet holes 1476 (and spatially offset from the inlet holes 1468).

As in other embodiments, the filter 1400 includes filter channels that provide fluid communication between the inlet holes 1468 and the outlet holes 1476 via transverse (relative to the main axis) fluid pathways through the filter channels. Depending on the elevational locations of the filter channels relative to the main axis, one or more sets of filter channels may receive fluid from the inlet holes 1468 via the first inner holes 1414 or the second inner holes 1418 and may provide fluid to the outlet holes 1476 via the first inner holes 1414 or the second inner holes 1418. In the illustrated embodiment, a first intermediate channel region (or layer) 1422 is disposed between the first (outer) substrate 1432 and the first inner substrate 1406, a second intermediate channel region (or layer) 1426 is disposed between the first inner substrate 1406 and the second inner substrate 1410, and a third intermediate channel region (or layer) 1430 is disposed between the second inner substrate 1410 and the second (outer) substrate 1436. The first intermediate channel region 1422, the second intermediate channel region 1426, and the third intermediate channel region 1430 each include a plurality of filter channels. Fluid flow through the filter channels is transverse (or, as described above, at some other angle) to the main axis of the filter 1400, as depicted by horizontal arrows. The network of fluid flow paths—defined by the inlet holes 1468, first inner holes 1414, second inner holes 1418, outlet holes 1476, and filter channels—is configured such that all fluid entering an inlet hole 1468 must pass through at least one filter channel before exiting one of the outlet holes 1476. The filter channels may be configured according to any of the embodiments described herein, such as illustrated in FIGS. 8-13D. The filter channels may be formed by material-additive and/or material-subtractive processes as described herein.

In other embodiments, the filter 1400 may include only one inner substrate between the first outer substrate 1432 and the second outer substrate 1436. In such embodiments, the filter 1400 may generally have the same configuration as that shown in FIG. 14. As an example, the single inner substrate has an array of inner holes passing through the inner substrate as described above. A first group of the inner holes are in direct fluid communication with corresponding inlet holes 1468, and a second group of inner holes are in direct fluid communication with corresponding outlet holes 1476. The filter 1400 has a first channel region between the first outer substrate 1432 and the inner substrate, and a second channel region between the inner substrate and the second outer substrate 1436. The first channel region includes a plurality of first channels extending in a plane at an angle to the main axis of the filter 1400, and the second channel region includes a plurality of second channels extending in a plane at an angle to the main axis. Each first channel communicates with at least one of the inlet holes 1468 and at least one of the inner holes, and each second channel communicates with at least one of the inner holes and at least one of the outlet holes 1476.

In other embodiments, the filter 1400 may include more than two inner substrates, thereby further increasing the capacity of the filter 1400.

High capacity filters are highly desirable because of their high porosity (without sacrificing pore dimensions or active area), low operation pressure and high clogging resistance. However, the capacity of conventional sintered stainless steel (SS) frits is very limited and decreases as the pore size decreases. On the other hand, the capacity of an engineered filter as disclosed herein may be increased multiple times by utilizing the configuration described above in conjunction with FIG. 14. For example, when an inner substrate (e.g., first inner substrate 1406 or second inner substrate 1410)—having a pattern of through-holes that is the combined pattern of inlet holes 1468 and outlet holes 1476, and having similar filter channels—is added between the two outer substrates (e.g., first substrate 1432 and second substrate 1436), the capacity of the filter doubles in comparison to the basic two-substrate filter design. This increased capacity is due to the addition of more filter channels in the network of fluid paths between the inlet and outlet holes of the two outer substrates. Further, when two stacked inner substrates (e.g., both the first inner substrate 1406 and second inner substrate 1410) having similar through-hole patterns and filter channels are added between the two outer substrates (as shown in FIG. 14), the capacity of the filter triples due to the addition of even more filter channels. Each time an additional substrate is added between the two outer substrates of the filter, the capacity of the filter is increased accordingly because of the added filter channels, which is achieved without increasing the active working area of the filter.

Figure 15:
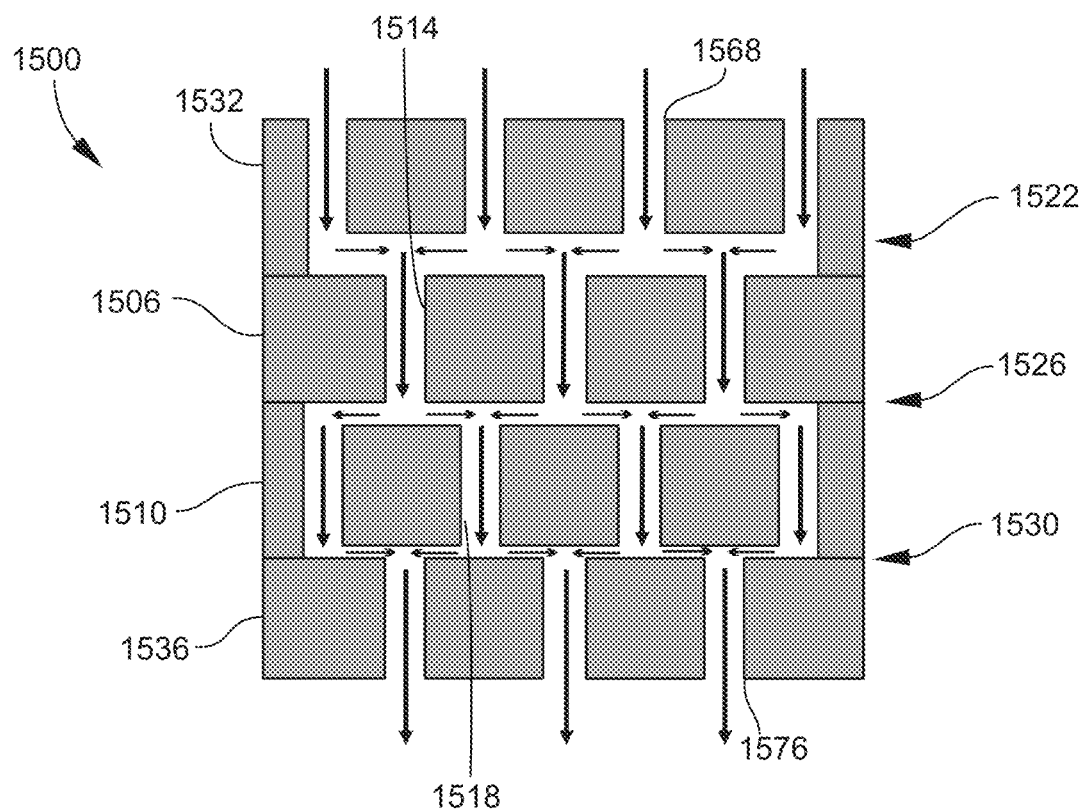
FIG. 15 is a schematic cross-sectional view of an example of a filter according to another embodiment.

FIG. 15 is a schematic cross-sectional view of an example of a filter 1500 according to another embodiment. The filter 1500 is another example of a multi-stage configuration.

The filter 1500 includes first (outer) substrate (or layer) 1532 having an array of inlet holes 1568 and a second (outer) substrate (or layer) 1536 having an array of outlet holes 1576. The filter 1500 further includes one or more additional, inner substrates (or layers) between the first (outer) substrate 1532 and the second (outer) substrate 1536. In the illustrated embodiment, the filter 1500 includes two inner substrates, namely a first inner substrate 1506 and a second inner substrate 1510. The first inner substrate 1506 includes an array or pattern of first inner holes 1514 running through its thickness, and the second inner substrate 1510 includes an array or pattern of second inner holes 1518 running through its thickness. The first inner holes 1514 and second inner holes 1518 are arranged to be part of the plurality of fluid flow paths (e.g., via filter channels) from the inlet holes 1568 to the outlet holes 1576. Fluid flow through the first inner holes 1514 and the second inner holes 1518, as well as the inlet holes 1568 and the outlet holes 1576, is parallel to the main axis of the filter 1500 as depicted by vertical arrows.

As in other embodiments, the filter 1500 includes filter channels that provide fluid communication between the inlet holes 1568 and the outlet holes 1576 via transverse (relative to the main axis) fluid pathways through the filter channels. In the illustrated embodiment, a first intermediate channel region (or layer) 1522 is disposed between the first (outer) substrate 1532 and the first inner substrate 1506, a second intermediate channel region (or layer) 1526 is disposed between the first inner substrate 1506 and the second inner substrate 1510, and a third intermediate channel region (or layer) 1530 is disposed between the second (outer) substrate 1536 and the second inner substrate 1510. The first intermediate channel region 1522, the second intermediate channel region 1526, and the third intermediate channel region 1530 each include a plurality of filter channels. Fluid flow through the filter channels is transverse (or, as described above, at some other angle) to the main axis of the filter 1500, as depicted by horizontal arrows. The network of fluid flow paths—defined by the inlet holes 1568, first inner holes 1514, second inner holes 1518, outlet holes 1576, and filter channels—is configured such that all fluid entering an inlet hole 1568 must pass through at least one filter channel in each of the three intermediate channel regions 1522, 1526, and 1530 sequentially before exiting one of the outlet holes 1576. The filter channels may be configured according to any of the embodiments described herein, such as illustrated in FIGS. 8-13D. The filter channels may be formed by material-additive and/or material-subtractive processes as described herein.

In an embodiment and as illustrated, the critical dimension (described above) of the filter channels is graduated, such that the critical dimension decreases at each successive intermediate channel region 1522, 1526, and 1530 along the main axis in the axial direction of fluid flow. In this configuration, the filter channels closest to the inlet side of the filter 1500 have the largest critical dimension, the filter channels closest to the outlet side of the filter 1500 have the smallest critical dimension, and intermediate levels of filter channels have respective critical dimensions that are successively reduced between largest critical dimension and the smallest critical dimension. For example, in the embodiment specifically illustrated in FIG. 15, the filter channels of the first intermediate channel region 1522 have a first critical dimension, which is the largest critical dimension provided by the filter 1500. The filter channels of the second intermediate channel region 1526 have a second critical dimension, which is less than the first critical dimension. The filter channels of the third intermediate channel region 1530 have a third critical dimension, which is less than the second critical dimension. Because in the present example the third intermediate channel region 1530 is the final channel region (closest to the outlet side of the filter 1500), the filter channels of the third intermediate channel region 1530 have the smallest critical dimension provided by the filter 1500.

With the graduated configuration, the filter 1500 provides a series of incrementally decreasing particle cut sizes. This configuration is useful for improving the clogging resistance of the filter 1500. By this configuration, any large, undesirable particles can be blocked first by larger filter channels, preventing them reaching to the smaller filter channels, which can be more easily clogged.

In other embodiments, the filter 1500 may include only one inner substrate between the first outer substrate 1532 and the second outer substrate 1536. In such embodiments, the filter 1500 may generally have the same configuration as that shown in FIG. 15. As an example, the single inner substrate has an array of inner holes passing through the inner substrate as described above. The filter 1500 has a first channel region between the first outer substrate 1532 and the inner substrate, and a second channel region between the inner substrate and the second outer substrate 1536. The first channel region includes a plurality of first channels extending in a plane at an angle to the main axis of the filter 1500, and the second channel region includes a plurality of second channels extending in a plane at an angle to the main axis. Each first channel communicates with at least one of the inlet holes 1568 and at least one of the inner holes, and each second channel communicates with at least one of the inner holes and at least one of the outlet holes 1576. The first channels have a first critical dimension, and the second channels have a second critical dimension less than the first critical dimension.

As another example, in an embodiment in which a single inner substrate is interposed between the first outer substrate 1532 and the second outer substrate 1536, the inner holes of the inner substrate may be spatially offset from both the inlet holes 1568 and the outlet holes 1576.

In other embodiments, the filter 1500 may include more than two inner substrates, thereby providing additional graduations in the critical dimension.

As in other embodiments, the outlet holes 1576 are not in direct fluid communication with the inlet holes 1568. This is due not only to the presence of the intervening filter channels, but also the presence of intermediate layers (e.g., first inner substrate 1506 and second inner substrate 1510). In the present embodiment, it is also convenient for the inlet holes 1568 and outlet holes 1576 to be spatially offset from (not aligned with) each other because of the use of two hole patterns and the even number of intervening layers. Further, in the present embodiment and as illustrated, the first inner holes 1514 are offset from the inlet holes 1568 and from the second inner holes 1518. Also, the second inner holes 1518, in addition to being offset from the first inner holes 1514, are offset from the outlet holes 1576. Thus, in this embodiment, the first inner holes 1514 are in direct fluid communication with neither the inlet holes 1568 nor the second inner holes 1518, and the second inner holes 1518 are in direct fluid communication with neither the first inner holes 1514 nor the outlet holes 1576. Generally, in embodiments where the fluid flows sequentially through multiple groups of filter channels, the holes of a given substrate may be offset from the holes of (each) adjacent substrate.

On the other hand, in other embodiments that contain an odd number of stacked substrates (e.g., 3, 5, etc.), the inlet holes 1568 and the outlet holes 1576 may be aligned with each other, but nonetheless are not in direct fluid communication with each other due to the intervening filter channels and one or more intermediate layers.

Generally, the inner holes of a given inner substrate may be offset from the inlet holes 1568, or from the outlet holes 1576, or from both the inlet holes 1568 and the outlet holes 1576, depending on the position of that inner substrate in the stack and how many substrates are provided in the filter.

Figure 1B:
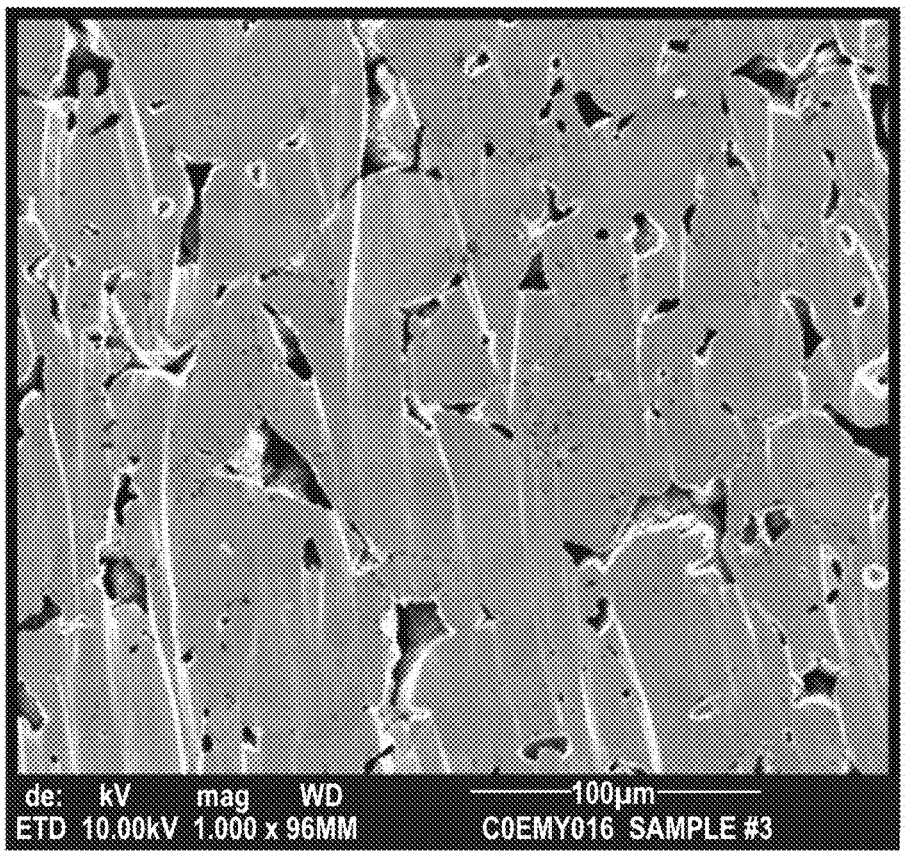
FIG. 1B is an SEM image of a cross-sectional view of a region of the conventional sintered SS frit shown in FIG. 1A.
Figure 2:
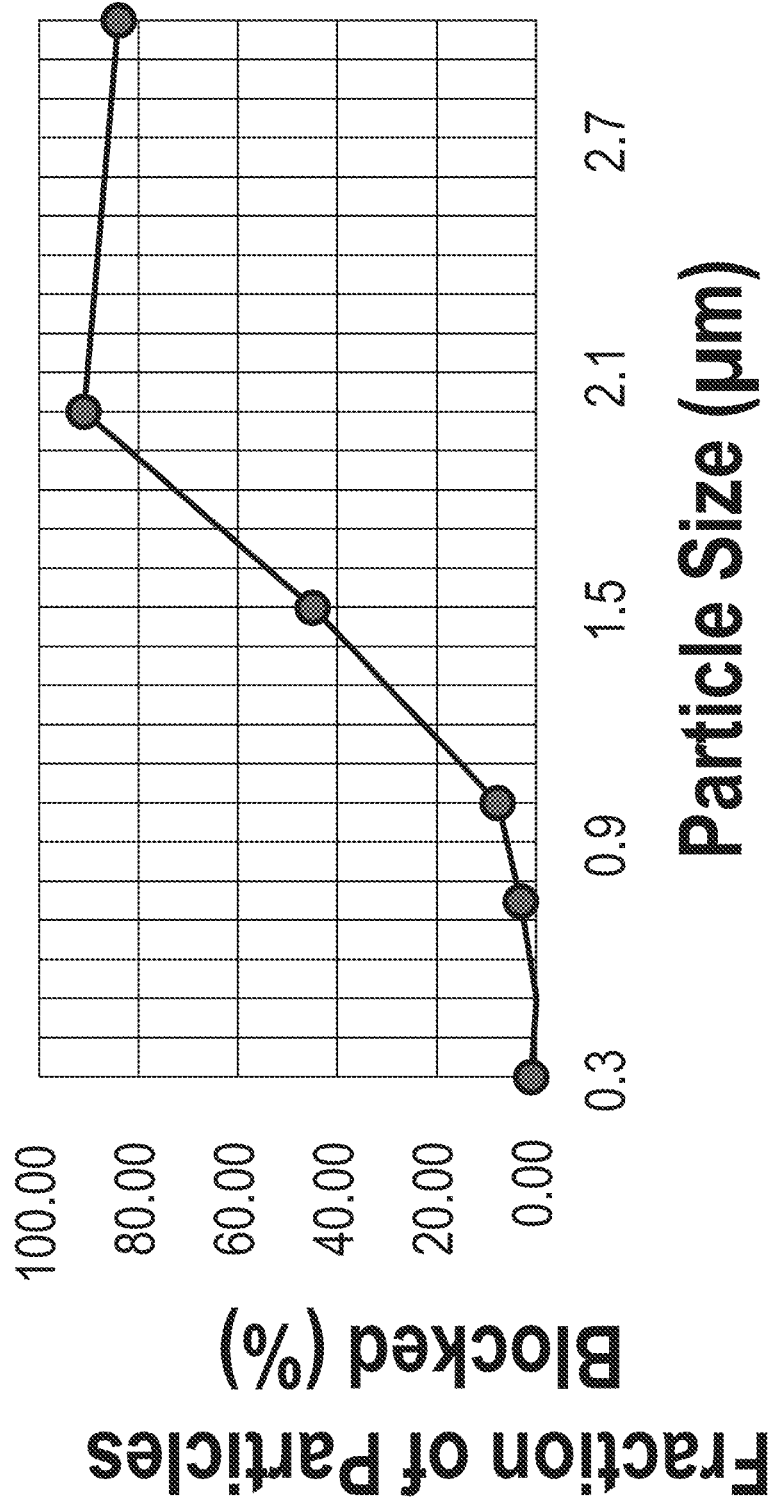
FIG. 2 is a plot of the transmission (filtration) characteristics of a conventional sintered SS frit such as shown in FIGS. 1A and 1B.
Figure 3:
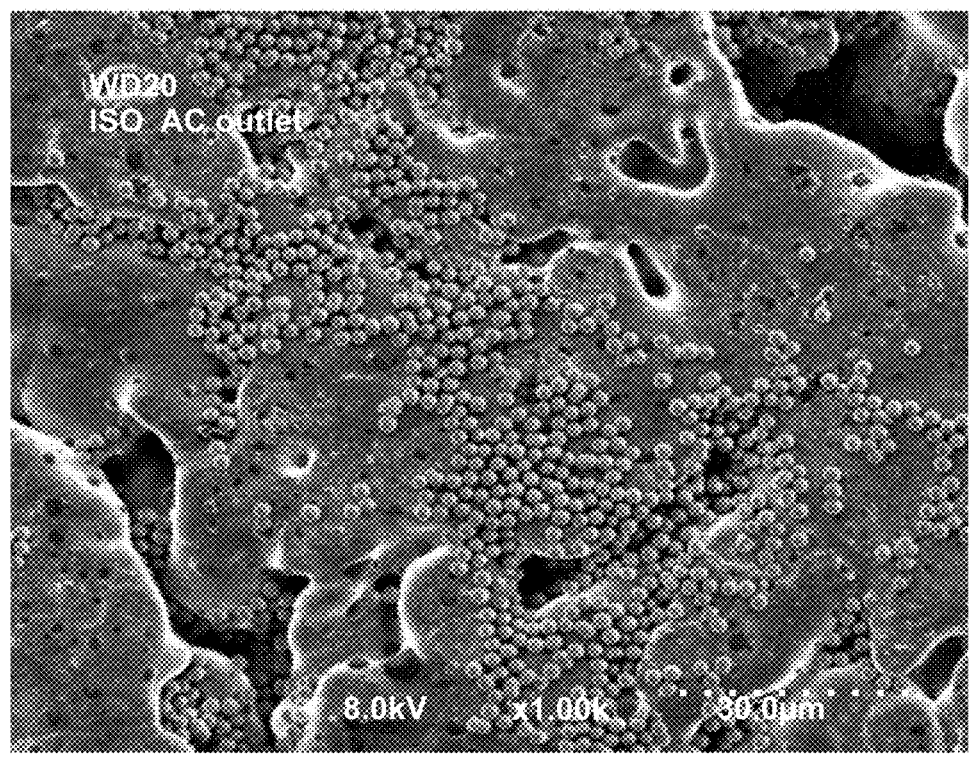
FIG. 3 is an SEM image of particles collected downstream from an LC column utilizing conventional sintered SS frits such as shown in FIGS. 1A and 1B.
Figure 4:
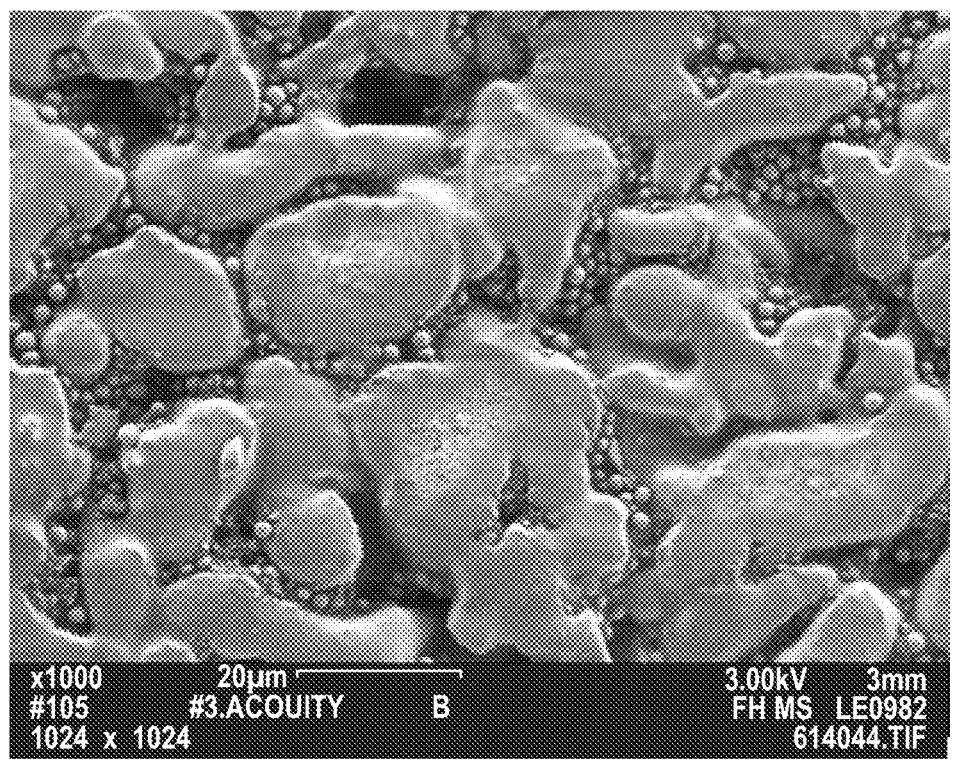
FIG. 4 is an SEM image of a region of a conventional frit preloaded with secondary particles.
Figure 16:
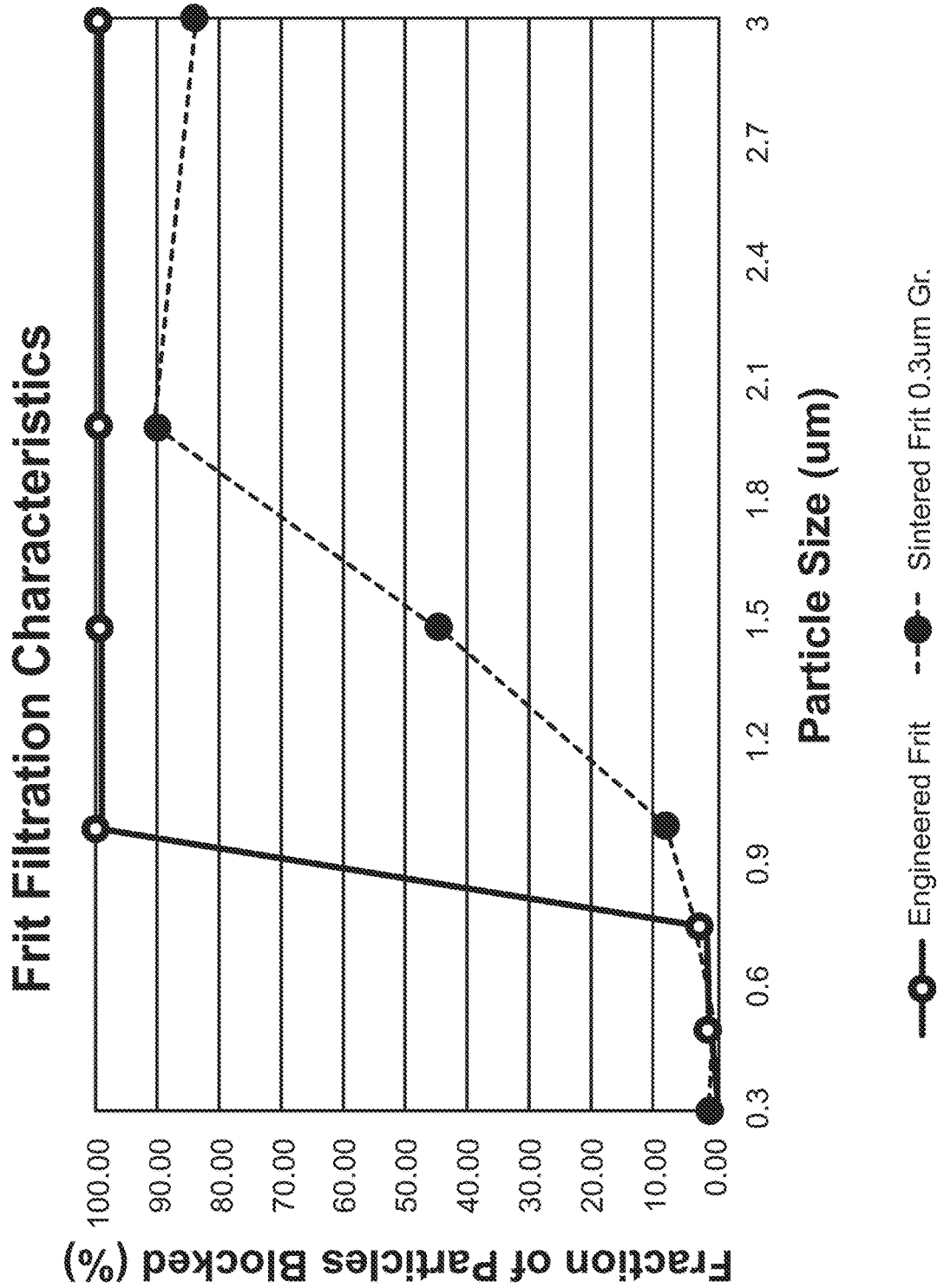
FIG. 16 is a plot comparing the transmission (filtration) characteristics of a conventional sintered SS frit such as shown in FIGS. 1A and 1B to the transmission (filtration) characteristics of a filter disclosed herein.

FIG. 16 illustrates plots comparing the transmission (filtration) characteristics of a conventional sintered SS frit, 0.3 μm grade (dotted line) such as shown in FIGS. 1A and 1B to the transmission (filtration) characteristics of a filter disclosed herein (solid line), namely the filter 500 described above and illustrated in FIGS. 5A-11B. The filter channels of the filter disclosed herein had a critical dimension of less than 1.0 μm. Specifically, FIG. 16 illustrates plots of the fraction of particles blocked (%) as a function of particle size (μm). The same fluid sample was run through both the conventional SS frit and the filter disclosed herein. FIG. 16 demonstrates that the filter disclosed herein has a narrow distribution of pore sizes that are smaller than 1 μm, and therefore shows a sharp particle cutoff curve that allowed 100% of the particles in the fluid smaller than 0.75 μm to pass through while blocking 100% of the particles larger than 1 μm. By comparison, the conventional SS frit has a significantly wider particle retaining range of from 0.75 μm to over 2 μm. Although specified as 0.3 μm grade, an extrapolated number from a bubble test and not a physical measurement, the conventional SS frit has a large range of pore sizes, with the maximum pore size being well over 2 μm.

A filter as described herein may be mounted to or integrated with a variety of fluidic components such as, for example, capillary tubes, fluidic fittings, chromatographic columns (or cartridges), microfluidic chips, and the like. In addition to columns or cartridges utilized in LC applications, the filter 500 may be mounted to or integrated with columns utilized in supercritical fluid chromatography (SFC) and extraction cells utilized in supercritical fluid extraction (SFE). A filter as described herein may be provided in a variety of liquid flow-based systems, with chromatography systems being just one example.

Figure 17:
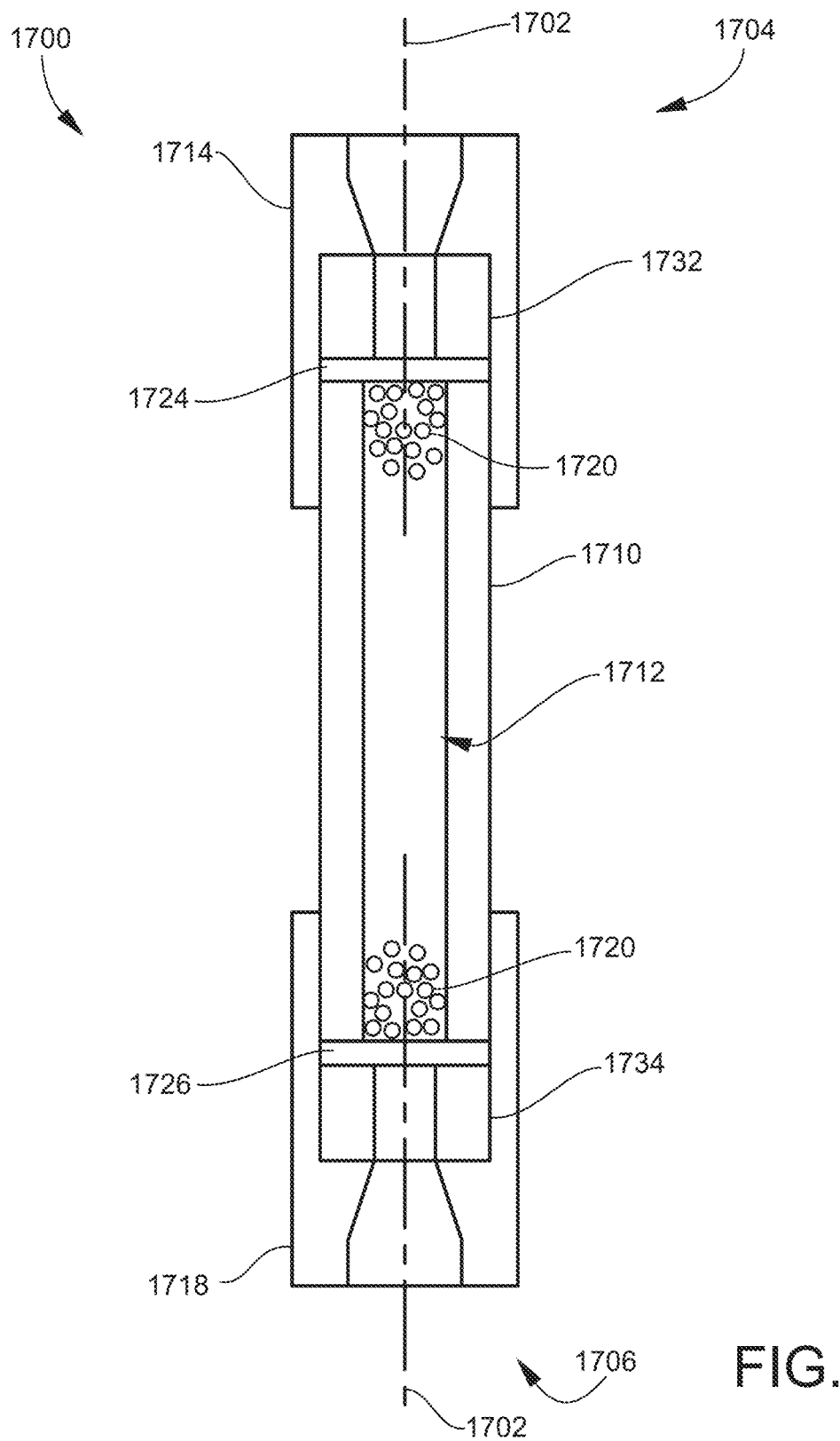
FIG. 17 is a cross-sectional view of an example of a chromatography column including filters as disclosed herein.

FIG. 17 is a cross-sectional view of an example of a chromatography column 1700 that includes filters as disclosed herein. The column 1700 generally extends along a central (or longitudinal) axis 1702 from a first column end 1704 to a second column end 1706. The features of the column 1700 may be the same at the first column end 1704 and the second column end 1706, in which case the designation of which column end 1704 or 1706 serves as the inlet end or the outlet end is arbitrary. The column 1700 generally includes a column wall 1710 elongated along the axis 1702 that encloses a column interior 1712. The wall 1710 is typically cylindrical (e.g., a tube) and thus the column interior 1712 is typically a cylindrical bore between the column ends 1704 and 1706. The column 1700 includes components at the column ends 1704 and 1706 for providing fluidic interfaces between the column interior 1712 and tubing or other fluidic components external to the column 1700. For example, the column 1700 may include a first end fitting 1714 securely engaging the wall 1710 at the first column end 1704, and a second end fitting 1718 securely engaging the wall 1710 at the second column end 1706. In the present context, "securely engaging" generally means that the end fittings 1714 and 1718 will not become disengaged from the wall 1710 during normal, intended operations of the column 1700, including at the pressures typically contemplated for the specific type of chromatography being performed (e.g., HPLC, UHPLC, SFC, etc.) and at the generally higher pressures applied during the packing of stationary phase media into the column 1700. The end fittings 1714 and 1718 may be securely engaged to the wall 1710 via the mating of complementary threads (not shown) on inside surfaces of the end fittings 1714 and 1718 and outside surfaces of the wall 1710. Alternatively, the end fittings 1714 and 1718 may be securely engaged to the wall 1710 by press-fitting, welding, brazing, etc. Each end fitting 1714 and 1718 includes a bore adapted for connection to the fluid lines of a chromatographic system. For example, the bore may include threads for engaging a fluid conduit fitting (not shown). Each bore is in fluid communication with the column interior 1712 of the wall 1710, whereby a fluid flow path is established from the first (inlet) column end 1704 (inlet end), through the column interior 1712 and to the second column end 1706 (outlet end).

The column interior 1712 extends from one axial end of the wall 1710 to the opposite axial end of the wall 1710. In the assembled form of the column 1700, the column interior 1712 contains (is filled with) a particulate packing material 1720 (only partially shown) providing the stationary phase for chromatography. The column 1700 includes frits (or filters) 1724 and 1726 configured to serve as axial boundaries that retain the particles of the packing material 1720 in place as a packed bed in the column interior 1712 while allowing fluid (e.g., a mobile phase/sample matrix) to flow through the frits 1724 and 1726. The frits 1724 and 1726 may be configured according to any of the embodiments disclosed herein, for example the filter 500 described above and illustrated in FIGS. 5A-12B. The frits 1724 and 1726 may be positioned at each axial end of the wall 1710. The column 1700 may also include respective frit retainers 1732 and 1734 between the end fittings 1714 and 1718 and frits 1724 and 1726. Each frit retainer 1732 and 1734 includes a through-bore in fluid communication with the column interior 1712 via the corresponding frit 1724 and 1726, thereby fluidly interconnecting the column interior 1712 and the bores of the end fittings 1714 and 1718. The frit retainers 1732 and 1734 may provide fluid-tight interfaces between the end fittings 1714 and 1718 and the fits 1724 and 1726. After loading the column interior 1712 with an appropriate amount of particulate material 1720, assembly of the column 1700 may entail screwing or otherwise securing the end fittings 1714 and 1718 onto the column 1700. Axial movement of the end fittings 1714 and 1718 axially compresses the end fittings 1714 and 1718 against the frit retainers 1732 and 1734, which in turn axially compresses the frit retainers 1732 and 1734 against the frits 1724 and 1726 and the frits 1724 and 1726 against the axial ends of the column wall 1710.

More generally, a filter as disclosed herein may be provided with any type of fluid conduit. The filter may be mounted at or integrated with the inlet end and/or outlet end of the conduit, or at a point inside the conduit between the inlet and outlet ends. The filter may be mounted to or integrated with a fluidic fitting attached to the inlet or outlet end of the conduit. The fluidic fitting may be of the type that provides a fluidly sealed connection between the conduit and another conduit or fluidic device.

FIG. 18 is a schematic view of an example of a fluidic system (or liquid flow-based system) 1800 that may include one or more filters as disclosed herein, for example any of the filters described above and illustrated in FIGS. 5A-15. The fluidic system 1800 may include various fluidic devices, for example fluidic devices 1804, 1808, and 1852. In the present context, a "fluidic device" generally is a device having a fluid inlet and/or a fluid outlet, and which defines one or more liquid flow paths communicating with the fluid inlet and/or fluid outlet. The fluidic device is configured to perform one or more specific functions on liquid in the flow path(s) of the fluidic device. The fluidic system 1800 may also include various fluid lines communicating with (e.g., fluidly coupled to) the fluid inlets and/or fluid outlets of the fluidic devices, and in some cases providing an external liquid flow path between two fluidic devices to enable liquid to be transferred from one fluidic device to another fluidic device. In the illustrated example, a fluid line 1826 communicates with the inlet of the fluidic device 1804, a fluid line 1812 communicates with the outlet of the fluidic device 1804 and the inlet of the fluidic device 1808, a fluid line 1854 communicates with the outlet of the fluidic device 1808 and the inlet of the fluidic device 1852, and a fluid line 1858 communicates with the outlet of the fluidic device 1852.

In various embodiments, one or more filters as disclosed herein may be integrated with one or more of the fluidic devices 1804, 1808, and 1852. Alternatively or additionally, one or more filters as disclosed herein may be positioned in the flow path(s) of one or more of the fluid lines 1826, 1812, 1854, and 1858.

In some embodiments, at least a part of the liquid flow path provided by the fluidic system 1800 operates at high pressure. In the present context, examples of "high pressure" include, but are not limited to, a range of from 100 bar to 1500 bar or greater.

In one specific embodiment, the fluidic system 1800 is a liquid chromatography (LC) system. In such an example, the fluidic device 1804 may be a pump, the fluidic device 1808 may be a chromatographic column, and the fluidic device 1852 may be a detector. Further, the fluid line 1826 may be a solvent supply line, the fluid line 1812 may be a solvent delivery (or mobile phase) line, the fluid line 1854 may be a column output line, and the fluid line 1858 may be a detector output line. The design and operation of various components of chromatography systems and other types of fluid separation systems are generally known to persons skilled in the art and thus need not be described in detail herein. In one embodiment, a filter as disclosed herein may be utilized as a frit in the chromatographic column, as described above and illustrated in FIG. 17.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A filter, comprising:
an inlet side;
an outlet side; and
a body having a thickness along a main axis between the inlet side and the outlet side, and a planar area in a transverse plane orthogonal to the main axis, the body comprising:
a first substrate comprising a substantially constant thickness and a first outside surface at the inlet side, a first inside surface, and an array of inlet holes passing through the first substrate from the first outside surface to the first inside surface;
a second substrate comprising a second outside surface at the outlet side, a second inside surface facing the first inside surface, and an array of outlet holes passing through the second substrate from the second inside surface to the second outside surface, wherein the outlet holes are not in direct fluid communication with the inlet holes; and
a channel region comprising a plurality of channels extending in parallel at an angle to the main axis, each channel of the plurality of channels communicating with at least one of the inlet holes and at least one of the outlet holes, wherein:
each of the inlet holes directly communicates with two or more adjacent parallel channels of the plurality of channels;
a channel of the two or more adjacent parallel channels is disposed adjacent to another channel of the two or more adjacent parallel channels substantially along a length of the another channel;
the filter comprises a plurality of fluid flow paths through the body from the inlet side to the outlet side; and
each of the fluid flow paths comprises a first turn between the at least one of the inlet holes and the two or more adjacent parallel channels, and a second turn between the two or more adjacent parallel channels and the at least one of the outlet holes.

2. The filter of claim 1, wherein the inlet holes and the outlet holes are parallel with the main axis.

3. The filter of claim 1, wherein the inlet holes, or the outlet holes, or both the inlet holes and the outlet holes, are slot-shaped.

4. The filter of claim 1, wherein the plurality of channels extend along the transverse plane, and the first turn and the second turn are ninety-degree transitions.

5. The filter of claim 1, wherein the inlet holes are elongated along a first transverse axis of the transverse plane, and the channels are elongated along another largest dimension along a second transverse axis of the transverse plane orthogonal to the first transverse axis.

6. The filter of claim 1, wherein the outlet holes are elongated along a first transverse axis of the transverse plane, and the channels are elongated along a second transverse axis of the transverse plane orthogonal to the first transverse axis.

7. The filter of claim 1, wherein one or more of the outlet holes each communicate with two or more of the channels.

8. The filter of claim 1, wherein:
the channel region is integral with the first inside surface;
the channel region is integral with the second inside surface;
the channel region is a layer interposed between the first inside surface and the second inside surface; or
a combination thereof.

9. The filter of claim 1, wherein each channel of the plurality of channels has a cross-sectional area, and the cross-sectional area is defined at least in part by a critical dimension that is less than a minimum size of particles to be blocked by the filter.

10. The filter of claim 9, wherein the cross-sectional area is defined by a depth along the main axis and a width in the transverse plane, and the critical dimension is the smaller of the depth and the width.

11. The filter of claim 1, wherein each channel of the plurality of channels has a cross-sectional area defined by a depth along the main axis and a width in the transverse plane, and wherein the depth is greater than the width or less than the width.

12. The filter of claim 1, wherein the outlet holes are offset from the inlet holes.

13. The filter of claim 1, wherein the plurality of channels have a critical dimension in a range from 0.5 µm to 50 µm.

14. A filter, comprising:
an inlet plate having a first outside surface and a first set of holes extending in a first direction to form oval-shaped oblong openings along the first outside surface;
an outlet plate having a second outside surface and a second set of holes extending in the first direction to form oblong openings along the second outside surface, wherein the first set of holes and the second set of holes are offset from one another, and wherein the first outside surface and the second outside surface are oriented as opposite outer surfaces; and
a plurality of parallel channels extending in a second direction,
wherein the plurality of parallel channels is positioned (i) between the inlet plate and the outlet plate, (ii) on the inlet plate or the outlet plate, or (iii) in the inlet plate or the outlet plate, and wherein at least one of the openings along the first outside surface directly communicates with two or more adjacent parallel channels of the plurality of parallel channels and at least one of the openings along the second outside surface directly communicates with the two or more adjacent parallel channels of the plurality of parallel channels.

15. A filter comprising:
an inlet structure having a first outside surface and a first set of holes to form non-circular openings along the first outside surface;
an outlet structure having a second outside surface and a second set of holes to form openings along the second outside surface, wherein the first set of holes and the second set of holes are offset from one another, and wherein the first outside surface and the second outside surface are oriented as opposite outer surfaces; and
a plurality of channels extending in a direction that is different from a direction of the first set of holes, wherein the plurality of channels is contiguously engaged with at least one of the inlet structure or the outlet structure, and
wherein at least one of the openings along the first outside surface directly communicates with two or more adjacent channels of the plurality of channels and at least one of the openings along the second outside surface directly communicates with the two or more adjacent channels of the plurality of channels.

16. The filter of claim 15, wherein at least one channel of the plurality of channels is sloped relative to a plane that includes the plurality of channels.

17. The filter of claim 15, wherein at least one channel of the plurality of channels includes a circular cross-section.

18. The filter of claim 15, wherein each channel of the plurality of channels includes a cross-sectional area that is defined at least by a dimension that is less than a minimum size of particles to be blocked by the filter.

* * * * *